(12) United States Patent
Kubota et al.

(10) Patent No.: US 11,777,340 B2
(45) Date of Patent: Oct. 3, 2023

(54) CHARGING CASE FOR ELECTRONIC CONTACT LENS

(71) Applicant: ACUCELA INC., Seattle, WA (US)

(72) Inventors: Ryo Kubota, Seattle, WA (US); Patrizia Weber, Bern (CH); Marco Burgener, Bern (CH); Jonas Butscher, Zürich (CH); Praveenth Sanmugarajah, Biberist (CH); Hans Bernhard, Schliern (CH); Amitava Gupta, Roanoke, VA (US)

(73) Assignee: ACUCELA INC., Seattle, WA (US)

( * ) Notice: Subject to any disclaimer, the term of this patent is extended or adjusted under 35 U.S.C. 154(b) by 0 days.

(21) Appl. No.: 17/904,450

(22) PCT Filed: Feb. 19, 2021

(86) PCT No.: PCT/US2021/070166
§ 371 (c)(1),
(2) Date: Aug. 17, 2022

(87) PCT Pub. No.: WO2021/168481
PCT Pub. Date: Aug. 26, 2021

(65) Prior Publication Data
US 2023/0063265 A1    Mar. 2, 2023

Related U.S. Application Data

(60) Provisional application No. 62/979,994, filed on Feb. 21, 2020.

(51) Int. Cl.
*H02J 50/10* (2016.01)
*H02J 50/40* (2016.01)
(Continued)

(52) U.S. Cl.
CPC ............ *H02J 50/10* (2016.02); *A45C 11/005* (2013.01); *A45C 15/00* (2013.01); *G02C 7/04* (2013.01);
(Continued)

(58) Field of Classification Search
CPC ..................................................... H02J 7/0042
(Continued)

(56) References Cited

U.S. PATENT DOCUMENTS 6,516,808 B2    2/2003    Schulman
7,018,040 B2    3/2006    Blum
(Continued)

FOREIGN PATENT DOCUMENTS

EP    3153139    4/2017
EP    3413116    12/2018
(Continued)

OTHER PUBLICATIONS

Adler, Daniel, et al., "The possible effect of under correction on myopic progression in children," Clin Exp Optom., 89:315-321 (2006).
(Continued)

*Primary Examiner* — Edward Tso
*Assistant Examiner* — Ahmed H Omar
(74) *Attorney, Agent, or Firm* — FISHERBROYLES LLP; John Shimmick

(57) ABSTRACT

A contact lens charging case comprises a container sized and shaped to receive an electronic contact lens ("eCL") and charging coil to couple to a coil of the eCL. In some embodiments, the charging coil comprises a diameter larger than a diameter of the coil of the eCL, so as to decrease sensitivity of the location and orientation of the eCL in the container and improve coupling between the coils. In some embodiments, the charging coil is dimensioned so as to
(Continued)

extend at least partially around the container that receives the eCL.

20 Claims, 27 Drawing Sheets

(51) Int. Cl.
  *A45C 11/00* (2006.01)
  *A45C 15/00* (2006.01)
  *G02C 7/04* (2006.01)
  *G02C 11/00* (2006.01)
  *H02J 7/00* (2006.01)

(52) U.S. Cl.
  CPC ............ *G02C 11/10* (2013.01); *H02J 7/0013* (2013.01); *H02J 7/0044* (2013.01); *H02J 50/40* (2016.02)

(58) Field of Classification Search
  USPC ........................................................ 320/108
  See application file for complete search history.

(56) References Cited

U.S. PATENT DOCUMENTS

| | | |
|---|---|---|
| 8,246,167 B2 | 8/2012 | Legerton |
| 8,432,124 B2 | 4/2013 | Foster |
| 8,662,664 B2 | 3/2014 | Artal Soriano |
| 8,857,983 B2 | 10/2014 | Pugh |
| 9,345,813 B2 | 5/2016 | Hogg |
| 9,482,882 B1 | 11/2016 | Hanover |
| 9,482,883 B1 | 11/2016 | Meisenholder |
| 9,726,904 B1 | 8/2017 | Lin |
| 9,763,827 B2 | 9/2017 | Kelleher |
| 9,885,884 B2 | 2/2018 | Drobe |
| 9,918,894 B2 | 3/2018 | Lam |
| 9,962,071 B2 | 5/2018 | Yates |
| RE47,006 E | 8/2018 | To |
| 10,133,092 B2 | 11/2018 | Tsubota |
| 10,139,521 B2 | 11/2018 | Tran |
| 10,146,067 B2 | 12/2018 | Tsai |
| 10,231,897 B2 | 3/2019 | Tse |
| 10,268,050 B2 | 4/2019 | To |
| 10,288,909 B1 | 5/2019 | Youssef |
| 10,591,745 B1 | 3/2020 | Lin |
| 10,788,686 B2 | 9/2020 | Tsai |
| 10,884,264 B2 | 1/2021 | Hones |
| 10,921,612 B2 | 2/2021 | Zhou |
| 10,993,515 B1 | 5/2021 | Kim |
| 11,000,186 B2 | 5/2021 | Linder |
| 11,163,166 B1 | 11/2021 | Ebert |
| 11,187,921 B2 | 11/2021 | Zhou |
| 11,219,287 B1 | 1/2022 | Kim |
| 11,275,259 B2 | 3/2022 | Kubota |
| 11,281,022 B2 | 3/2022 | Buscemi |
| 11,320,674 B2 | 5/2022 | Kubota |
| 11,358,001 B2 | 6/2022 | Kubota |
| 11,366,339 B2 | 6/2022 | Kubota |
| 11,366,341 B1 | 6/2022 | Kubota |
| 11,402,662 B2 | 8/2022 | Wyss |
| 11,409,136 B1 | 8/2022 | Kubota |
| 11,415,818 B2 | 8/2022 | Olgun |
| 11,444,488 B2 | 9/2022 | Bohn |
| 11,446,514 B2 | 9/2022 | Bahmani |
| 11,460,720 B1 | 10/2022 | Kubota |
| 11,467,423 B2 | 10/2022 | Buscemi |
| 11,467,426 B2 | 10/2022 | Kubota |
| 11,467,428 B2 | 10/2022 | Kubota |
| 11,480,813 B2 | 10/2022 | Kubota |
| 11,531,216 B2 | 12/2022 | Kubota |
| 11,583,696 B2 | 2/2023 | Kubota |
| 11,619,831 B2 | 4/2023 | Wyss |
| 11,630,329 B2 | 4/2023 | Kubota |
| 2002/0186345 A1 | 12/2002 | Duppstadt |
| 2003/0011745 A1 | 1/2003 | Molebny |
| 2004/0237971 A1 | 12/2004 | Radhakrishnan |
| 2004/0246441 A1 | 12/2004 | Stark |
| 2004/0257529 A1 | 12/2004 | Thomas |
| 2005/0258053 A1* | 11/2005 | Sieg .................... A45C 11/005 206/459.1 |
| 2006/0082729 A1 | 4/2006 | To |
| 2006/0227067 A1 | 10/2006 | Iwasaki |
| 2007/0002452 A1 | 1/2007 | Munro |
| 2007/0076217 A1 | 4/2007 | Baker |
| 2007/0115431 A1 | 5/2007 | Smith, III |
| 2007/0127349 A1 | 6/2007 | Hotta |
| 2007/0281752 A1 | 12/2007 | Lewis |
| 2008/0291391 A1 | 11/2008 | Meyers |
| 2008/0309882 A1 | 12/2008 | Thorn |
| 2009/0002631 A1 | 1/2009 | Campbell |
| 2009/0187242 A1 | 7/2009 | Weeber |
| 2009/0201460 A1 | 8/2009 | Blum |
| 2009/0204207 A1 | 8/2009 | Blum |
| 2010/0076417 A1 | 3/2010 | Suckewer |
| 2010/0294675 A1 | 11/2010 | Mangano |
| 2010/0296058 A1 | 11/2010 | Ho |
| 2011/0085129 A1 | 4/2011 | Legerton |
| 2011/0153012 A1 | 6/2011 | Legerton |
| 2011/0157554 A1 | 6/2011 | Kawai |
| 2011/0202114 A1 | 8/2011 | Kessel |
| 2012/0055817 A1* | 3/2012 | Newman ............... A45C 11/005 206/216 |
| 2012/0062836 A1 | 3/2012 | Tse |
| 2012/0199995 A1 | 8/2012 | Pugh |
| 2012/0206485 A1 | 8/2012 | Osterhout |
| 2012/0212399 A1 | 8/2012 | Border |
| 2012/0215291 A1 | 8/2012 | Pugh |
| 2013/0027655 A1 | 1/2013 | Blum |
| 2013/0072828 A1 | 3/2013 | Sweis |
| 2013/0194540 A1* | 8/2013 | Pugh ................. B29D 11/00817 623/6.11 |
| 2013/0278887 A1 | 10/2013 | Legerton |
| 2013/0317487 A1 | 11/2013 | Luttrull |
| 2014/0039048 A1 | 2/2014 | Olof |
| 2014/0039361 A1 | 2/2014 | Siu |
| 2014/0194773 A1 | 7/2014 | Pletcher |
| 2014/0218647 A1 | 8/2014 | Blum |
| 2014/0240665 A1 | 8/2014 | Pugh |
| 2014/0268029 A1 | 9/2014 | Pugh |
| 2014/0277291 A1 | 9/2014 | Pugh |
| 2014/0379054 A1 | 12/2014 | Cooper |
| 2015/0057701 A1 | 2/2015 | Kelleher |
| 2015/0109574 A1 | 4/2015 | Tse |
| 2015/0160477 A1 | 6/2015 | Dai |
| 2015/0200554 A1 | 7/2015 | Marks |
| 2015/0241706 A1 | 8/2015 | Schowengerdt |
| 2016/0016004 A1 | 1/2016 | Hudson |
| 2016/0056498 A1 | 2/2016 | Flitsch |
| 2016/0067037 A1 | 3/2016 | Rosen |
| 2016/0067087 A1 | 3/2016 | Tedford |
| 2016/0091737 A1 | 3/2016 | Kim |
| 2016/0143801 A1 | 5/2016 | Lam |
| 2016/0158486 A1 | 6/2016 | Colbaugh |
| 2016/0212404 A1 | 7/2016 | Maiello |
| 2016/0270656 A1 | 9/2016 | Samec |
| 2016/0377884 A1 | 12/2016 | Lau |
| 2017/0000326 A1 | 1/2017 | Samec |
| 2017/0001032 A1 | 1/2017 | Samec |
| 2017/0010480 A1 | 1/2017 | Blum |
| 2017/0014074 A1 | 1/2017 | Etzkorn |
| 2017/0055823 A1 | 3/2017 | Lu |
| 2017/0072218 A1 | 3/2017 | Rucker |
| 2017/0078623 A1 | 3/2017 | Hilkes |
| 2017/0097519 A1 | 4/2017 | Lee |
| 2017/0115512 A1 | 4/2017 | Pugh |
| 2017/0184875 A1 | 6/2017 | Newman |
| 2017/0229730 A1 | 8/2017 | Flitsch |
| 2017/0236255 A1 | 8/2017 | Wetzstein |
| 2017/0270636 A1 | 9/2017 | Shtukater |
| 2017/0276963 A1 | 9/2017 | Brennan |
| 2017/0307779 A1 | 10/2017 | Marullo |
| 2018/0017810 A1 | 1/2018 | Wu |
| 2018/0017814 A1 | 1/2018 | Tuan |

(56) References Cited

U.S. PATENT DOCUMENTS

| | | |
|---|---|---|
| 2018/0052319 A1 | 2/2018 | Mccabe |
| 2018/0055351 A1 | 3/2018 | Yates |
| 2018/0074322 A1 | 3/2018 | Rousseau |
| 2018/0090958 A1 | 3/2018 | Steger |
| 2018/0092738 A1 | 4/2018 | Tai |
| 2018/0136486 A1 | 5/2018 | Macnamara |
| 2018/0136491 A1 | 5/2018 | Ashwood |
| 2018/0161231 A1 | 6/2018 | Tse |
| 2018/0173010 A1 | 6/2018 | Harant |
| 2018/0188556 A1 | 7/2018 | Portney |
| 2018/0221140 A1 | 8/2018 | Rosen |
| 2018/0264284 A1* | 9/2018 | Alvarez ............... A61N 5/0622 |
| 2018/0275427 A1 | 9/2018 | Lau |
| 2018/0345034 A1 | 12/2018 | Butzloff |
| 2019/0033618 A1 | 1/2019 | Choi |
| 2019/0033619 A1 | 1/2019 | Neitz |
| 2019/0038123 A1 | 2/2019 | Linder |
| 2019/0049730 A1 | 2/2019 | Miller |
| 2019/0076241 A1 | 3/2019 | Alarcon Heredia |
| 2019/0092545 A1 | 3/2019 | Oag |
| 2019/0107734 A1 | 4/2019 | Lee |
| 2019/0113757 A1 | 4/2019 | Van Heugten |
| 2019/0129204 A1 | 5/2019 | Tsubota |
| 2019/0227342 A1 | 7/2019 | Brennan |
| 2019/0235279 A1 | 8/2019 | Hones |
| 2019/0247675 A1 | 8/2019 | Legerton |
| 2019/0250413 A1 | 8/2019 | Martin |
| 2019/0250432 A1 | 8/2019 | Kim |
| 2019/0314147 A1 | 10/2019 | Blum |
| 2019/0318589 A1 | 10/2019 | Howell |
| 2020/0033637 A1 | 1/2020 | Jamshidi |
| 2020/0073148 A1 | 3/2020 | Alhaideri |
| 2020/0089023 A1 | 3/2020 | Zhou |
| 2020/0108272 A1 | 4/2020 | Bahmani |
| 2020/0110265 A1 | 4/2020 | Serdarevic |
| 2020/0133024 A1 | 4/2020 | Paune Fabre |
| 2020/0142219 A1 | 5/2020 | Rousseau |
| 2020/0183169 A1 | 6/2020 | Peng |
| 2020/0264455 A1 | 8/2020 | Olgun |
| 2020/0360184 A1 | 11/2020 | Xiao |
| 2020/0364992 A1 | 11/2020 | Howell |
| 2021/0018762 A1 | 1/2021 | Zheleznyak |
| 2021/0031051 A1 | 2/2021 | Kubota |
| 2021/0048690 A1 | 2/2021 | Guillot |
| 2021/0069524 A1 | 3/2021 | Kubota |
| 2021/0231977 A1 | 7/2021 | Zhou |
| 2021/0263336 A1 | 8/2021 | Gupta |
| 2021/0298440 A1 | 9/2021 | Kim |
| 2021/0329764 A1 | 10/2021 | Linder |
| 2021/0356767 A1 | 11/2021 | Kubota |
| 2021/0376661 A1 | 12/2021 | Bohn |
| 2021/0379399 A1 | 12/2021 | Buscemi |
| 2021/0382325 A1 | 12/2021 | Kubota |
| 2021/0382326 A1 | 12/2021 | Kubota |
| 2021/0389607 A1 | 12/2021 | Buscemi |
| 2022/0057651 A1 | 2/2022 | Segre |
| 2022/0107508 A1 | 4/2022 | Zhou |
| 2022/0179213 A1 | 6/2022 | Zhou |
| 2022/0231523 A1 | 7/2022 | Bristol |
| 2022/0257972 A1 | 8/2022 | Kubota |
| 2022/0299795 A1 | 9/2022 | Wyss |
| 2022/0390766 A1 | 12/2022 | Kubota |
| 2022/0397775 A1 | 12/2022 | Bahmani |

FOREIGN PATENT DOCUMENTS

| | | |
|---|---|---|
| JP | 2006292883 | 10/2006 |
| JP | 2011518355 | 6/2011 |
| KR | 20180038359 A | 4/2018 |
| TW | M356929 | 5/2009 |
| TW | 201234072 | 8/2012 |
| TW | 201734580 | 10/2017 |
| WO | 2009074638 A3 | 6/2009 |
| WO | 2009121810 | 10/2009 |
| WO | 2009129528 | 10/2009 |
| WO | 2010015255 A1 | 2/2010 |
| WO | 2010043599 | 4/2010 |
| WO | 2011089042 | 7/2011 |
| WO | 2012136470 | 10/2012 |
| WO | 2013087518 | 6/2013 |
| WO | 2013158418 | 10/2013 |
| WO | 2014033035 | 3/2014 |
| WO | 2014050879 | 4/2014 |
| WO | 2014191460 | 12/2014 |
| WO | 2015063097 | 5/2015 |
| WO | 2015186723 | 12/2015 |
| WO | 2015192117 | 12/2015 |
| WO | 2017094886 | 6/2017 |
| WO | 2017097708 | 6/2017 |
| WO | 2018014712 | 1/2018 |
| WO | 2018014960 | 1/2018 |
| WO | 2018075229 | 4/2018 |
| WO | 2018085576 | 5/2018 |
| WO | 2018088980 | 5/2018 |
| WO | 2018208724 | 11/2018 |
| WO | 2019114463 | 6/2019 |
| WO | 2019191510 | 10/2019 |
| WO | 2019217241 | 11/2019 |
| WO | 2020014074 | 1/2020 |
| WO | 2020014613 | 1/2020 |
| WO | 2020028177 | 2/2020 |
| WO | 2020069232 | 4/2020 |
| WO | 2021022193 | 2/2021 |
| WO | 2021056018 | 3/2021 |
| WO | 2021116449 | 6/2021 |
| WO | 2021168481 | 8/2021 |
| WO | 2021231684 | 11/2021 |
| WO | 2021252318 | 12/2021 |
| WO | 2021252319 | 12/2021 |
| WO | 2021252320 | 12/2021 |
| WO | 2022217193 | 10/2022 |
| WO | 2022258572 | 12/2022 |

OTHER PUBLICATIONS

Aleman, Andrea C., et al.,, "Reading and Myopia: Contrast Polarity Matters," Scientific Reports, 8 pages (2018).

Arden, G.B., et al., "Does dark adaptation exacerbate diabetic retinopathy? Evidence and a linking hypothesis," Vision Research 38:1723-1729 (1998).

Arden, GB, et al., "Regression of eariy diabetic macular edema is associated with prevention of dark adaptation", in Eye, (2011). 25, pp. 1546-1554.

Benavente-Perez, A., et al., "Axial Eye Growth and Refractive Error Development Can be Modified by Exposing the Peripheral Retina to Relative Myopic or Hyperopic Defocus," Invest Ophthalmol Vis Sci., 55:6765-6773 (2014).

Bonar, Jr, et al., "High brightness low power consumption microLED arrays", in SPIE DigitalLibrary.org/conference-proceedings-of-spie, SPIE OPTO, 2016, San Francisco, California, United States, Abstract Only.

Carr, Brittany J., et al., "The Science Behind Myopia," retrieved from https://webvision.med.utah.edu/book/part-xvii-refractive-errors/the-science-behind-myopia-by-brittany-j-carr-and-william-k-stell/, 89 pages (2018).

Chakraborty, R., et al., "Diurnal Variations in Axial Length, Choroidal Thickness, Intraocular Pressure, and Ocular Biometrics," IOVS, 52(8):5121-5129 (2011).

Chakraborty, R., et al., "Hyperopic Defocus and Diurnal Changes in Human Choroid and Axial Length," Optometry and Visual Science, 90(11):1187-1198 (2013).

Chakraborty, R., et al., "Monocular Myopic Defocus and Daily Changes in Axial Length and Choroidal Thickness of human Eyes," Exp Eye Res, 103:47-54 (2012).

Cook, Colin A., et al., "Phototherapeutic Contact Lens for Diabetic Retinopahty," 2018 IEEE Micro Electro Mechanical Systems, pp. 62-65, XP033335512, (Jan. 21, 2018).

Cooper, J., et al, "Current status of the development and treatment of myopia", Optometry, 83:179-199 (2012).

(56) References Cited

OTHER PUBLICATIONS

Cooper, J., et al., "A Review of Current Concepts of the Etiology and Treatment of Myopia," Eye & Contact Lens, 44(4):231-247 (Jul. 2018).
Demory, B., et al., "Integrated parabolic microlenses on micro LED color pixels", in Nanotechnology, (2018); 29, 16, pp. 1018, Abstract Only.
Dolgin, Elie, "The Myopia Boom," Nature 519:276-278 (2015).
Edrington, Timothy B., "A literature review: The impact of rotational stabilization methods on toric soft contact lens performance," Contact Lens & Anterior Eye, 34:104-110 (2011).
Flitcroft, D.I., "The complex interactions of retinal, optical and environmental factors in myopia aetiology," 31(6):622-660 (2012).
Garner, L.F., et al., "Crystalline Lens Power in Myopia," Optometry and Vision Science, 69:863-865 (1992).
Gwiazda, Jane, "Treatment Options for Myopia," retrieved from https://www.ncbi.nlm.nih.gov/pmc/articles/PMC2729053/, Optom Vis Sci., 86(6):624-628 (Jun. 2009).
Gwiazda, Jane, et al., "A Randomized Clinical Trial of Progressive Addition Lenses versus Single Vision Lenses on the Progression of Myopia in Children", Invest Ophthalmol Vis Sci, 44:1492-500 [PubMed: 12657584] (2003).
Haglund, Erik, et al., "Multi-wavelength VCSEL arrays using high-contrast gratings," Proc. of SPIE vol. 10113, 7 pages (2017).
Hammond, D.S., et al., "Dynamics of active emmetropisation in young chicks—influence of sign and magnitude of imposed defocus" Ophthalmic Physiol Opt. 33:215-222 (2013).
Henry W., "MicroLED Sources enable diverse ultra-low power applications", in Photonic Spectra, 2013.
International Search Report and Written Opinion for International Application No. PCT/US2021/070166, 11 pages (dated May 19, 2021).
Jayaraman, V., et al., "Recent Advances in MEMS-VCSELs for High Performance Structural and Functional SS-OCT Imaging," Proc. of SPIE vol. 8934, retrieved from http://proceedings.spiedigitallibrary.org/ on Dec. 1, 2015 (2014).
Jones, D., "Measure Axial Length to Guide Myopia Management," Review of Myopia Management, 5 pages (Apr. 9, 2020).
Kur, Joanna, et al., "Light adaptation does not prevent early retinal abnormalities in diabetic rats," Scientific Reports, 3 pages (Feb. 8, 2016).
Lagreze, Wolf A., et al., "Preventing Myopia," retrieved from https://www.ncbi.nlm.nih.gov/pmc/articles/PMC5615392/, Dtsch Arztebl Int., 114(35-36):575-580 (Sep. 2017).
Lam, Carly Siu Yin, et al., "Defocus Incorporated Multiple Segments (DIMS) spectacle lenses slow myopia progression: a 2-year randomised clinical trial," Br. J. Ophthalmol. 0:1-6 (2019).
Leo, Seo-Wei, et al., "An evidence-based update on myopia and interventions to retard its progression," J AAPOS, 15(2):181-189 (Apr. 2011).
Lingley, A.R., et al, : A single pixel wireless contact lens display, in J Micromech. Microeng., 2011; 21, 125014; doi:10.1088/0960-1317/21/12/125014, Abstract Only.
Martin, J.A., et al., "Predicting and Assessing Visual Performance with Multizone Bifocal Contact Lenses," Optom Vis Sci, 80(12):812-819 (2003).
Matkovic, K., et al., "Global Contrast Factor—a New Approach to Image Contrast," Computational Aesthetics in Graphics, Visualization and Imaging, 9 pages (2005).
McKeague C, et al. "Low-level night-time light therapy for age-related macular degeneration (ALight): study protocol for a randomized controlled trial", in Trials 2014, 15:246, http://www.trialsjournal.com/content/15/1/246.
Moreno, I, "Creating a desired lighting pattern with an LED array" in Aug. 2008, Proceedings of SPIE—The International Society for Optical Engineering 7058, DOI: 10.1117/12.795673.
Moreno, I., "Modeling the radiation pattern of LEDS", in Optics Express, 2008; 16, 3 pp. 1808.
Nickla, Debora L., et al., "Brief hyperopic defocus or form deprivation have varying effects on eye growth and ocular rhythms depending on the time-of-day of exposure," Exp Eye Res. 161:132-142 (Aug. 2017).
Ramsey, DJ, and Arden, GB, "Hypoxia and dark adaptation in diabetic retinopathy: Interactions, consequences and therapy", in Microvascular Complications-Retinopathy (JK Sun, ed.), Cur Dab Rep (2015) 15: 118, DOI 10.1007/s11892-015-0686-2, Abstract Only.
Read, Scott A., et al., "Choroidal changes in human myopia: insights from optical coherence tomography imaging," Clin Exp Optom, 16 pages (2018).
Read, Scott A., et al., "Human Optical Axial Length and Defocus," IOVS, 51(12):6262-6269 (2010).
Shivaprasad, S, et al, "Clinical efficacy and safety of a light mask for prevention of dark adaptation in treating and preventing progression of early diabetic macular oedema at 24 months (CLEOPATRA): a multicentre, phase 3, randomised controlled trial," in www.thelancet.com/diabetes-endocrinology vol. 6, pp. 382-391 ( May 2018).
Smith, III, Earl L., "Optical treatment strategies to slow myopia progression: Effects of the visual extent of the optical treatment zone," retrieved from https://www.ncbi.nlm.nih.gov/pmc/articles/PMC3624048/, Exp Eye Res., 114:77-88 (Sep. 2013).
Srinivasan, S., "Ocular axes and angles: Time for better understanding," J. Cataract Refract. Surg., 42:351-352 (Mar. 2016).
Torii, Hidemasa, et al., "Violet Light Exposure can be a Preventive Strategy Against Myopia Progression," EBioMedicine 15:210-219 (2017).
Wallman, Josh, et al., "Homeostasis of Eye Growth and the Question of Myopia," Neuron, 43:447-468 (2004).
Wolffsohn, James A., et al., "Impact of Soft Contact Lens Edge Design and Midperipheral Lens Shape on the Epithelium and its Indentation With Lens Mobility," IOVS, 54(9):6190-6196 (2013).
Brennan NA, Toubouti YM, Cheng X, Bullimore MA. Efficacy in myopia control. Prog Retin Eye Res. Jul. 2021; 83:100923. Epub Nov. 27, 2020.
Walline JJ, Lindsley K, Vedula SS, Cotter SA, Multi DO, Twelker JD. Interventions to slow progression of myopia in children. Cochran Database Syst Rev. Dec. 7, 2011; (12):CD004916.
Zhou WJ, Zhang YY, Li H, Wu YF, Xu J, Lv S, Li G, Liu SC, Song SF. Five-year progression of refractive errors and incidence of myopia in school-aged children in western China. J Epidemiol. Jul. 5, 2016; 26(7):386-95. Epub Feb. 13, 2016.

* cited by examiner

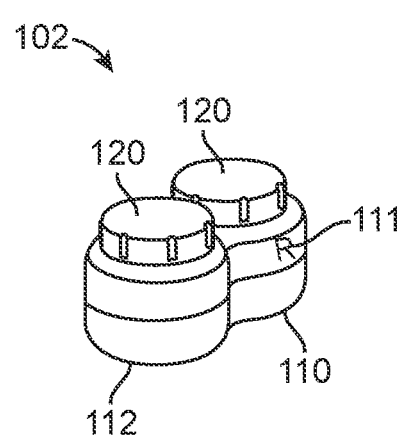
FIG. 1A
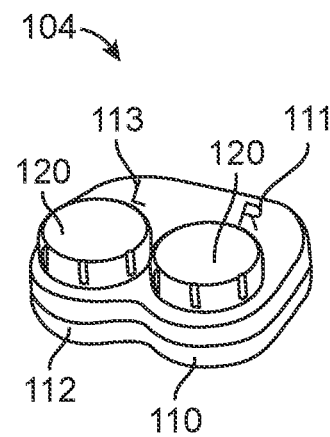
FIG. 1B
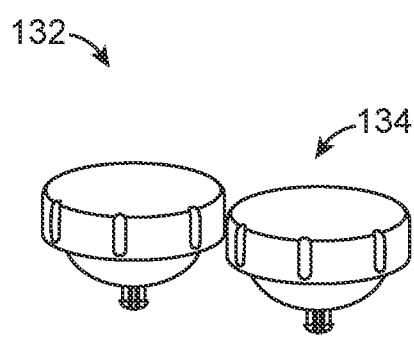
FIG. 1C1
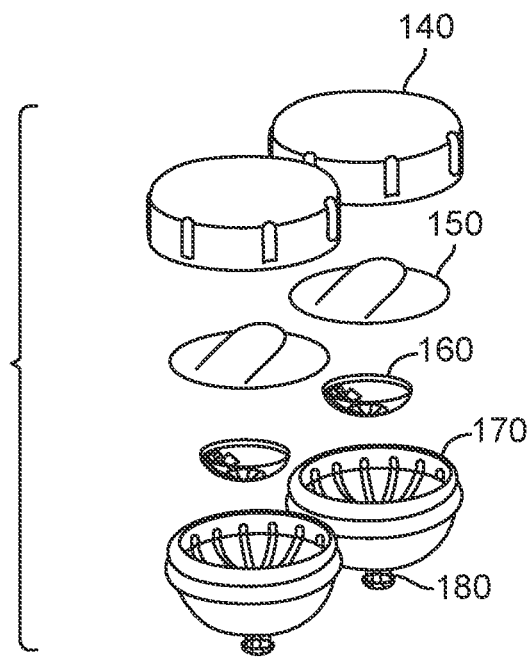
FIG. 1C2

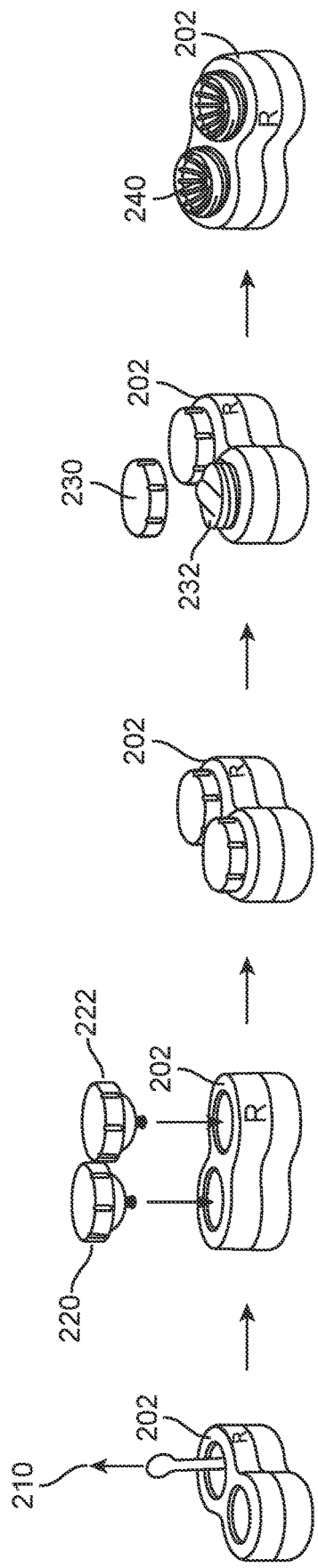

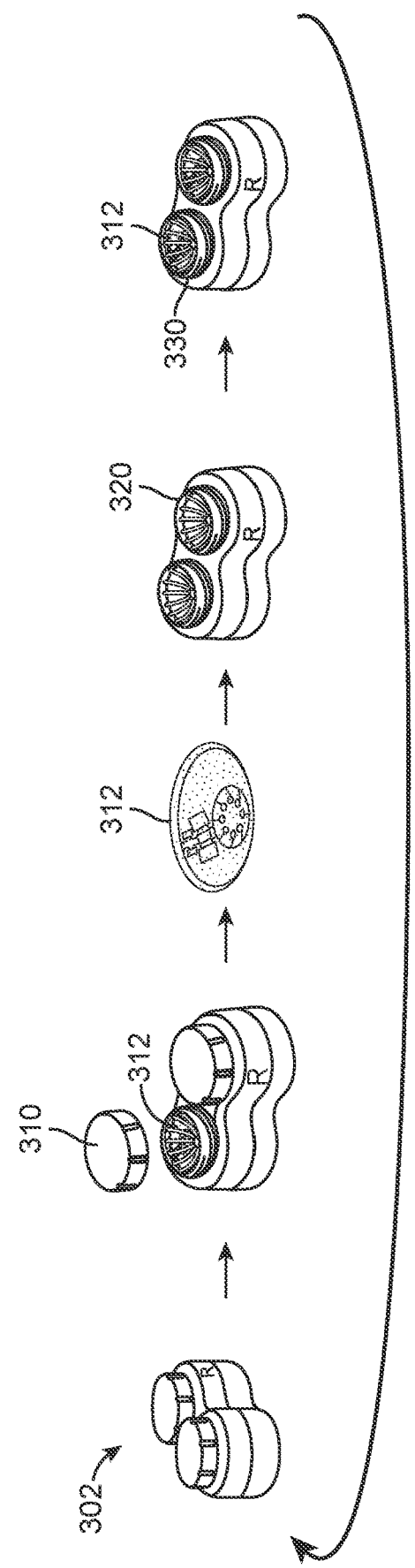

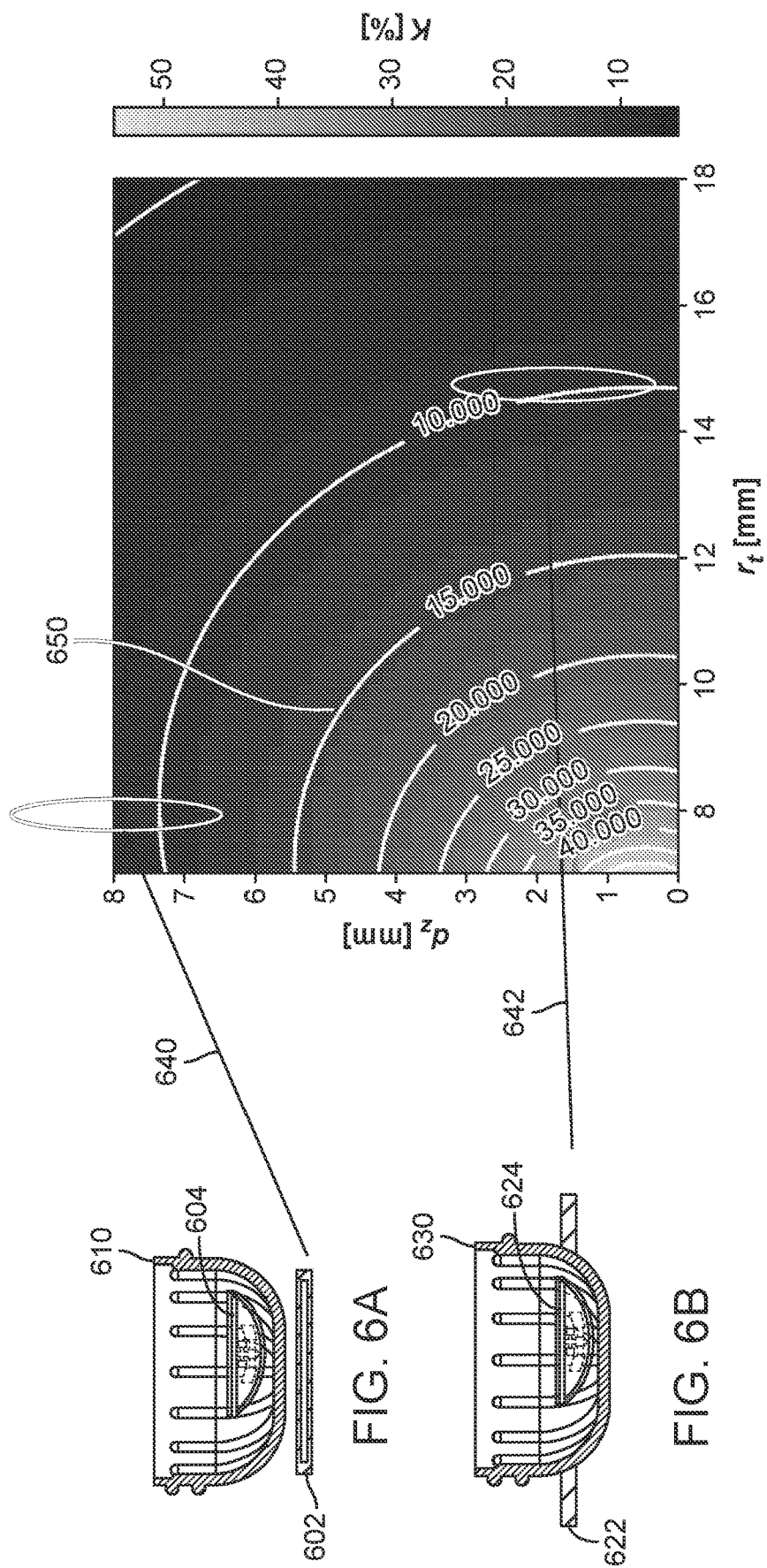

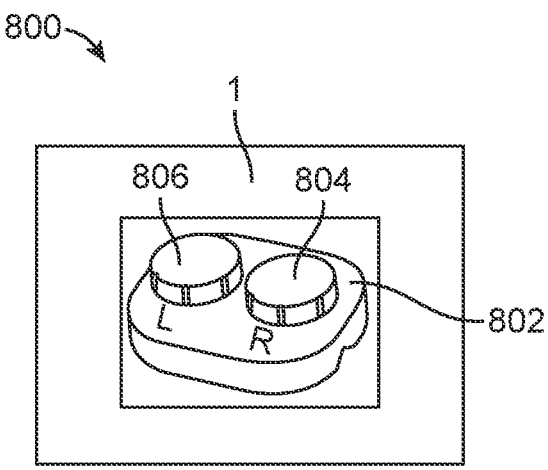
FIG. 8A
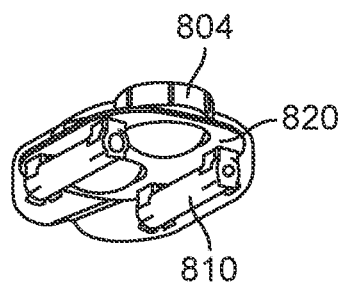
FIG. 8B
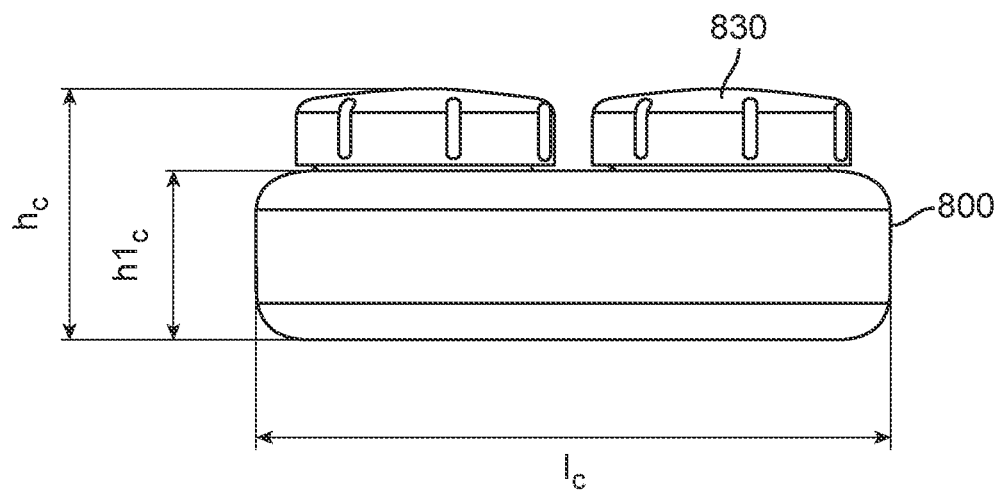
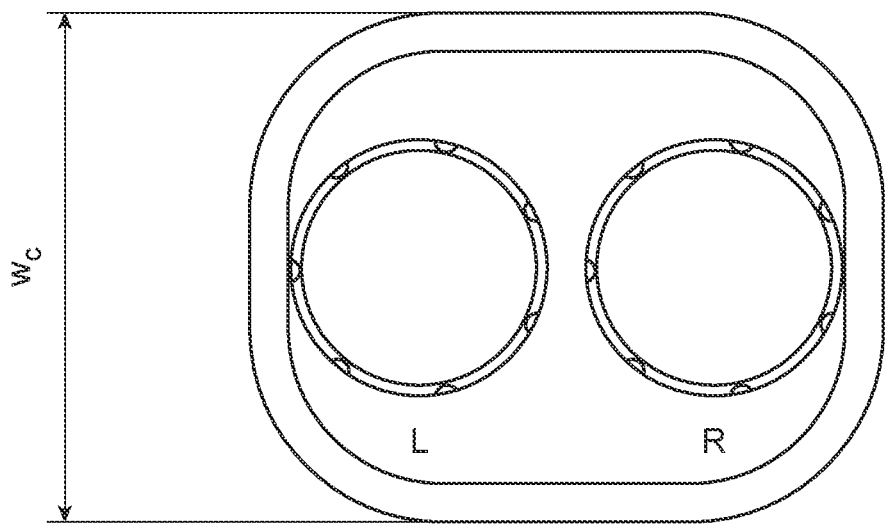
FIG. 8C

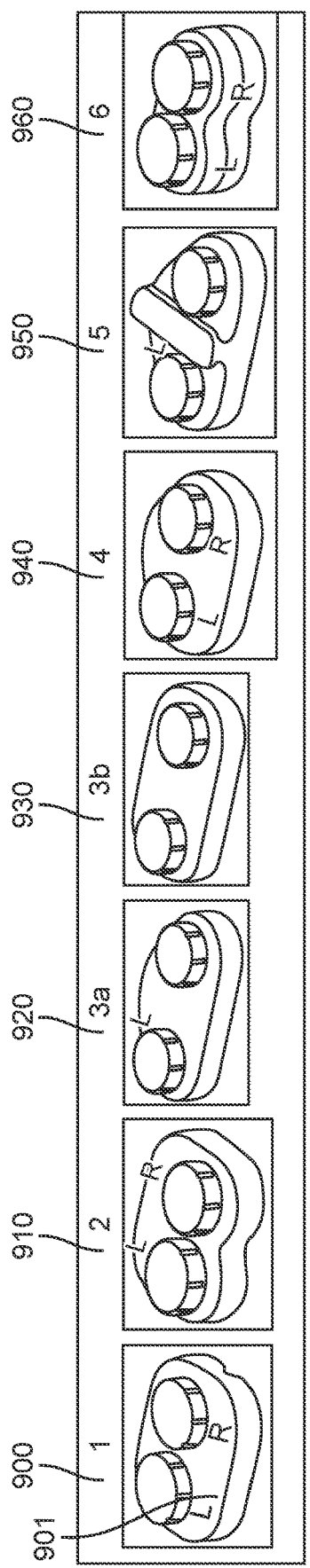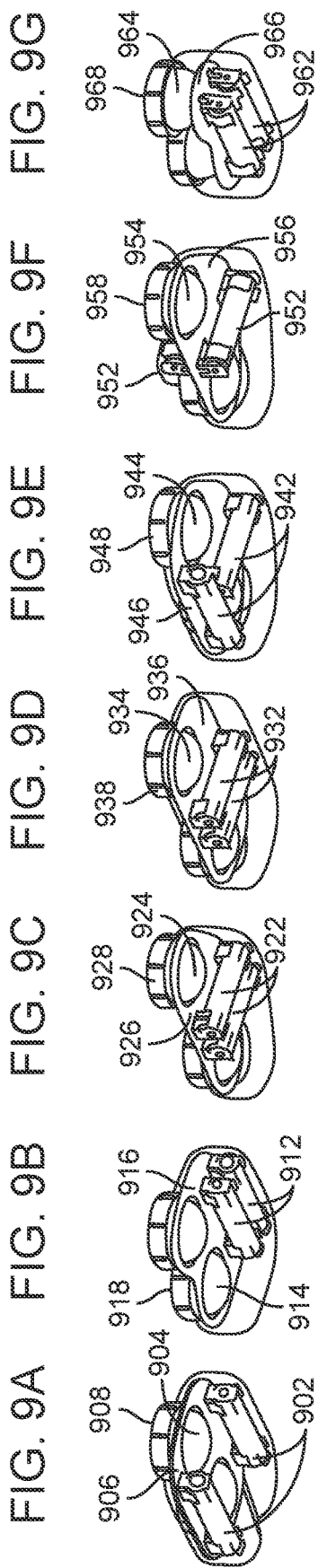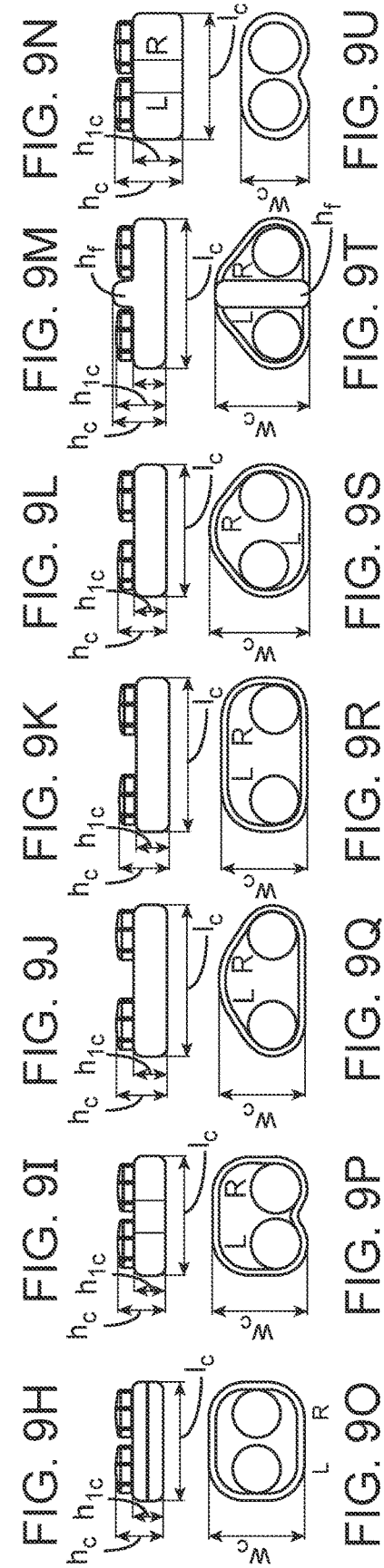

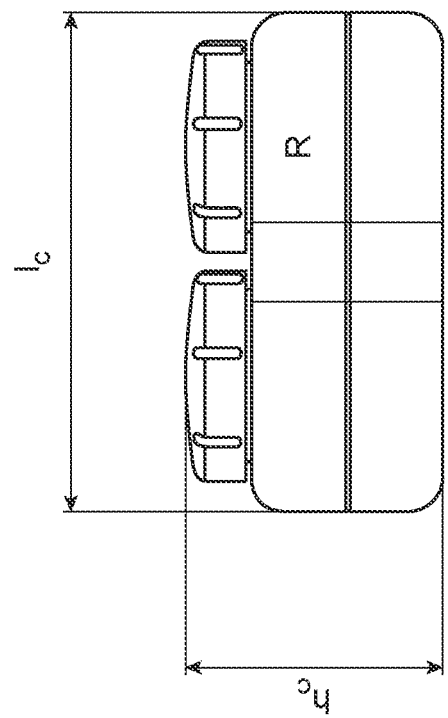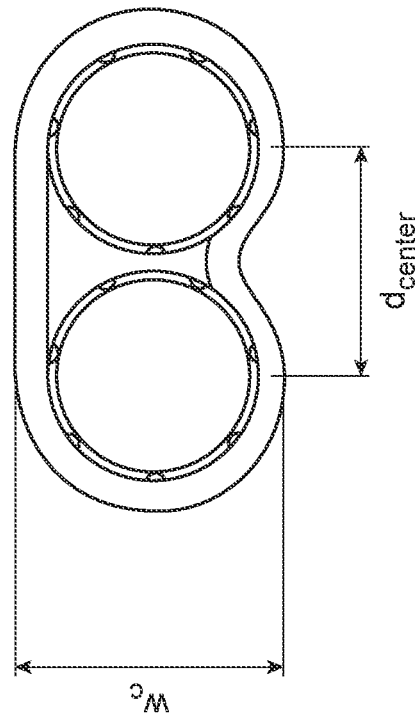
FIG. 11C
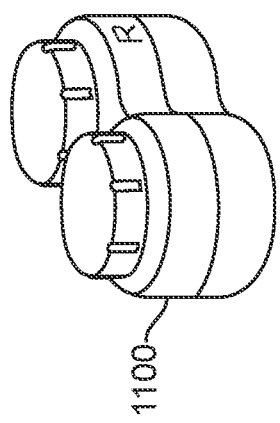
FIG. 11A
FIG. 11B

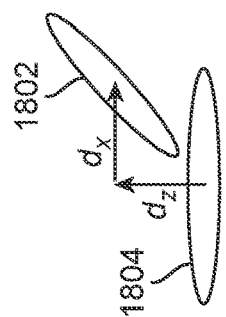
FIG. 18D
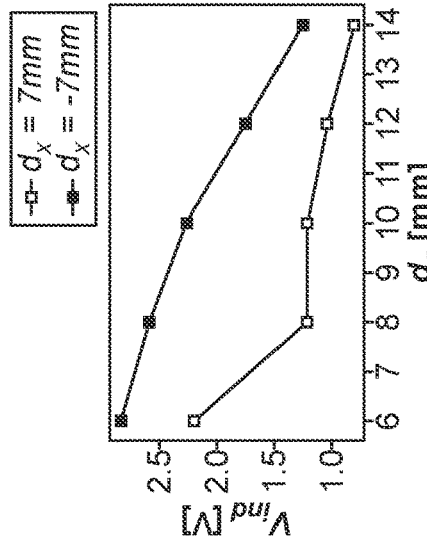
FIG. 18C
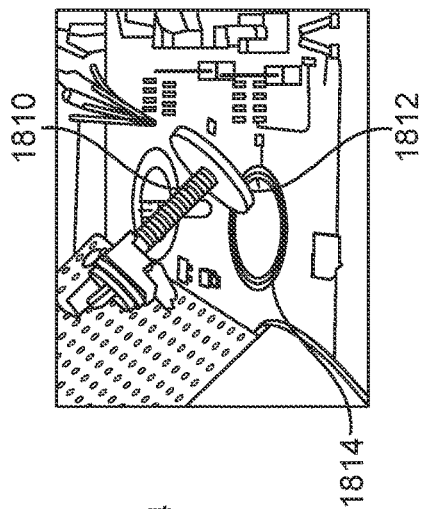
FIG. 18G
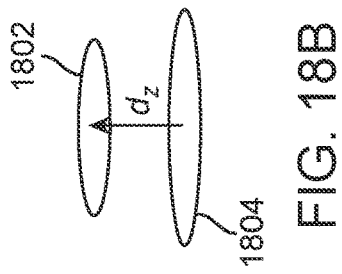
FIG. 18B
FIG. 18F
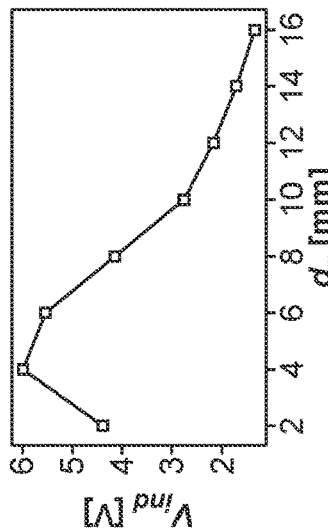
FIG. 18A
FIG. 18E

US 11,777,340 B2

CHARGING CASE FOR ELECTRONIC CONTACT LENS

RELATED APPLICATIONS

This application is a 371 national phase of PCT/US2021/070166, filed Feb. 19, 2021, published as WO 2021/168481 A1 on Aug. 26, 2021, and claims the benefit under 35 U.S.C. § 119(e) of U.S. Provisional Application No. 62/979,994, filed Feb. 21, 2020, entitled, "Charging Case for Electronic Contact Lens," the disclosures of which are incorporated, in their entirety, by this reference.

BACKGROUND

Electronic contact lenses ("eCLs") have been proposed for many purposes, such as monitoring glucose levels, generating visual displays, using for augmented reality applications, the treatment of diseases such as myopia and macular degeneration, and the noninvasive monitoring of vital signs and medical parameters. Electronic contact lenses may rely on circuitry that is powered with a rechargeable power source such as a battery. In some instances, it would be helpful to be able to recharge the power source of an electronic contact lens in an efficient and convenient manner.

Work in relation to the present disclosure suggests that the prior approaches to charging electronic contact lenses can be less than ideal in at least some instances. For example, the prior approaches can be more sensitive than would be ideal to the placement of the contact lens in the container where the contact lens is charged. Also, the prior approaches can be somewhat more sensitive to orientation of the contact lens recharging container than would be ideal. Prior eCLs may comprise an inductive antenna coil used to charge a battery in the eCL, and the coupling between the inductive antenna coil of the eCL and the charging circuitry can be less than ideal in at least some instances. This can result in less efficient charging of the eCL and more power being used to charge the eCL than would be ideal.

In light of the above, improved methods and apparatuses for charging electronic contact lenses are needed.

SUMMARY

Embodiments of the disclosure are directed to an electronic contact lens (eCL) charging case comprising a container sized and shaped to receive an eCL and a charging coil capable of being inductively coupled to a coil of the eCL. The charging coil can be configured in a manner to decrease the sensitivity of the charging process to the location and orientation of the eCL in the container. In some embodiments, the charging coil is configured in a manner to generate a voltage at the eCL coil for any orientation of the eCL coil within the container. In some embodiments, the antenna coil of the charging circuitry comprises a diameter larger than a diameter of the coil of the eCL, so as to decrease sensitivity of the location and orientation of the eCL in the container and improve the inductive coupling. In some embodiments, the charging coil is dimensioned so as to extend at least partially around the container that receives the eCL.

While the contact lens charging case of the disclosure can be configured in many ways, in some embodiments the charging case comprises an aperture sized and shaped to receive the container for the eCL, which allows the container to be inserted and removed from the charging case. In some embodiments, the eCL comprises a sterile eCL and the container comprises a sterile interior with a removable barrier, such as foil, adhered to the container. The removable container allows the contact lens charging case to be reused when an eCL and container are replaced with a new eCL and container.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIGS. 1A and 1B show electronic contact lens (eCL) cases with watertight housings, in accordance with some embodiments;

FIGS. 1C1 and 1C2 show a plurality of plastic contact lens containers and associated components, in accordance with some embodiments;

FIG. 2A shows removal of a battery activation strip, in accordance with some embodiments;

FIG. 2B shows placing eCL containers comprising compartments in an eCL case comprising a charger, in accordance with some embodiments;

FIG. 2C shows eCL charging with the eCLs in the charging case, in accordance with some embodiments;

FIG. 2D shows removal of covers and protection foil, in accordance with some embodiments;

FIG. 2E shows the eCL case with the covers removed and the charged eCL ready for removal and placement on the eye, in accordance with some embodiments;

FIG. 3A shows an eCL charging, in accordance with some embodiments;

FIG. 3B shows removal of covers and the eCL ready for removal and placement on the eye, in accordance with some embodiments;

FIG. 3C shows the eCL removed from the case to be worn on the eye, in accordance with some embodiments;

FIG. 3D shows the container being rinsed with contact lens solution, in accordance with some embodiments;

FIG. 3E shows an eCL placed in the correct compartment, in accordance with some embodiments;

FIG. 6A shows a charger coil below an eCL container, in which the charger coil comprises a diameter greater than a diameter of the eCL coil, in accordance with some embodiments;

FIG. 6B shows a charger coil around an eCL container, in which the charger coil comprises a diameter greater than the eCL container and the diameter of the eCL coil, in accordance with some embodiments;

FIG. 6C shows a COMSOL (a physics based finite element) simulation of the coupling parameter between the charging coil and the eCL coil with varying charger coil radius ($r_t$) and coil separation distance $d_z$, in accordance with some embodiments;

FIG. 8A shows a concept number 1 and 3D view of the case, in accordance with some embodiments;

FIG. 8B shows an integration approach for two AAA batteries and the charging coils as in FIG. 8A, in accordance with some embodiments;

FIG. 8C shows the dimensions of the charging case, in accordance with some embodiments;

FIGS. 9A through 9U show the different case shapes for the integration options of the considered components, i.e., batteries and PCB (charging coils) for concepts 1, 2, 3a, 3b, 4, 5 and 6, in accordance with some embodiments;

FIGS. 11A, 111B, and 11C show Concept 6, in accordance with some embodiments;

FIGS. 18A and 18B show a set of geometrical sweeps tested with dummy lenses with an axial coil displacement, in accordance with some embodiments;

FIGS. 18C and 18D show a set of geometrical sweeps tested with dummy lenses with an axial displacement and with the lens coil tilted at 45 degrees;

FIGS. 18E and 18F show a set of geometrical sweeps tested with dummy lenses with a lateral displacement, in accordance with some embodiments;

FIG. 18G shows a test probe comprising a coil corresponding to a dummy lens being swept over a test charging coil, in accordance with some embodiments;

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The charging case as described herein is well suited for use with many types of eCLs, including but not limited to eCLs used for glucose monitoring, generating visual displays, as part of augmented reality applications, and the treatment of refractive error such as myopia and macular degeneration.

Figure 1:
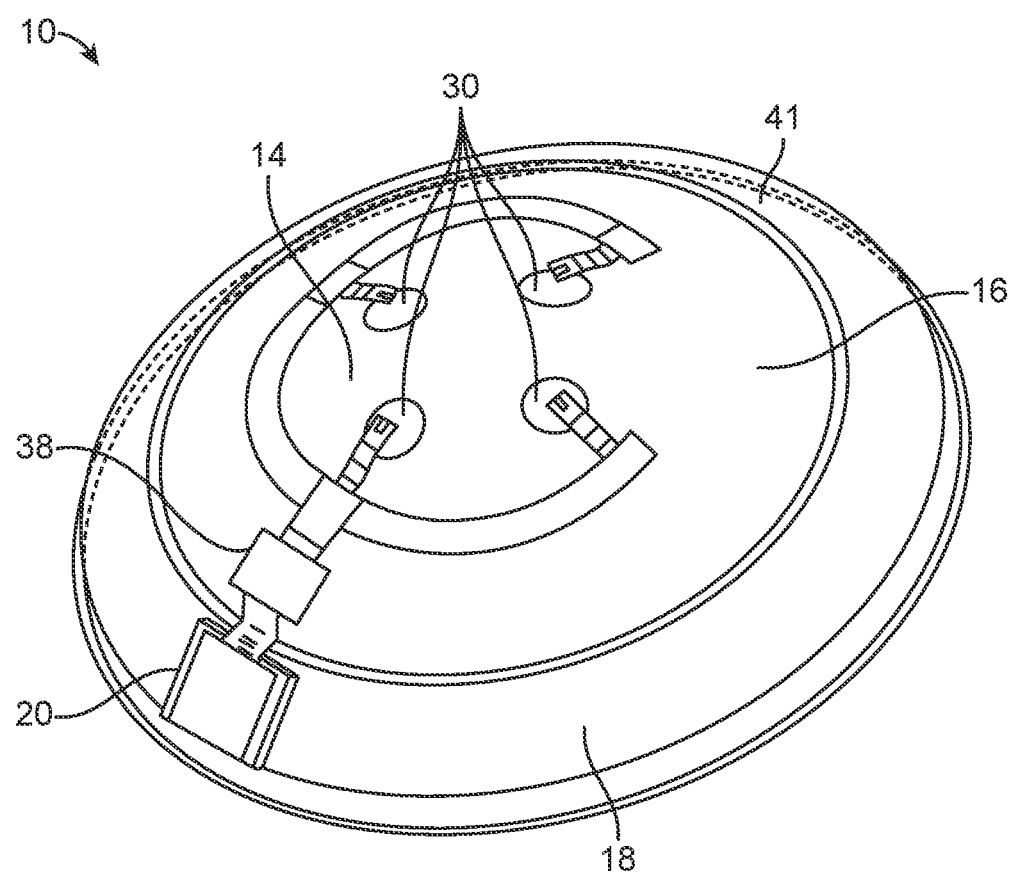
FIG. 1 shows an electronic contact lens ("eCL") suitable for use with an electronic contact lens charging case, in accordance with some embodiments.

FIG. 1 shows an electronic contact lens 10 suitable for use with an electronic contact lens charging case. Contact lens 10 comprises a base or substrate for the eCL, where the base or substrate comprises embedded electronic circuitry and/or optical elements. In some embodiments, the base may comprise a soft, biocompatible material such as a hydrogel or a silicone hydrogel polymer designed to be comfortable for sustained wear. In some embodiments, the contact lens 10 has a central optical zone 14 of diameter within a range from 6 mm to 9 mm, for example within a range from 7.0 mm to 8.0 mm. The central optical zone 14 is circumscribed by an outer annular zone, such as a peripheral zone 16 of width in a range 2.5 mm to 3.0 mm. The outer annular zone is surrounded by an outermost edge zone 18 of width in the range from 0.5 mm to 1.0 mm. The central optical zone 14 is configured to provide refractive correction and can be spherical, tori or multifocal in design, for example. The outer annular zone 16 peripheral to the optical zone 14 is configured to fit the corneal curvature and may comprise rotational stabilization zones for translational and rotational stability, while allowing movement of the contact lens 10 on the eye (not shown) following blinks. The edge zone 18 may comprise a thickness within a range from 0.05 mm to 0.15 mm and may be formed in a wedge shape. The overall diameter of the soft contact lens 10 can be within a range from 12.5 mm to 15.0 mm, for example within a range from 13.5 mm to 14.8 mm.

The embedded light sources 30 and the electronic circuitry are preferably located in the outer annular zone 16 of the contact lens 10, in which the outer annular zone is typically located outside the central optical zone, as shown in FIG. 1. The central optical zone 14 is preferably free from electronics and light sources 30 in order to not compromise the quality of central foveal or macular vision, in accordance with some embodiments. In some embodiments, the edge zone 18 does not comprise circuitry in order to maintain contact with the corneal surface and provide greater comfort for the wearer.

The light sources 30 can be arranged in many ways on the contact lens. For example, the light sources can be arranged in a substantially continuous ring around the central optical zone. In some embodiments, the plurality of light sources and the plurality of optical elements (e.g., lenses, mirrors or light guides) are coupled together to form a continuous ring of illumination.

Exemplary Electronic Contact Lens

In some embodiments, the contact lens 10 of FIG. 1 comprises a body composed of a soft biocompatible polymer with high oxygen permeability that is embedded with a transparent film populated with the electronic circuitry and optical components for the eCL. In some embodiments, body comprises a base or substrate upon which the electronic circuitry and optical components are located and supported. In some embodiments, this transparent film may comprise a transparent printed circuit board ("PCB") substrate. The thickness of the PCB can be within a range from about 5 microns to 50 microns and may comprise a plurality of layers of the film in order to utilize both surfaces of the PCB substrate for electronic circuitry. The PCB substrate can be curved to conform to the geometry of the base contact lens 10, with a curvature within a range about 7.5 mm to about 10.0 mm, for example within a range from about 8.0 mm to about 9.5 mm, for example. The PCB substrate can be configured or constructed in a manner to provide suitable oxygen permeability. In some embodiments, the PCB is perforated to improve its permeability to one or more of oxygen, tear fluid, nutrients, or carbon dioxide. In some embodiments, the PCB has a low tensile modulus, for example within a range from about 1 MPa to about 50 MPa, although stiffer films may also be used. In some embodiments, a preferred material for a transparent flexible PCB substrate comprises a polyimide that is cast from a liquid or a solution, and may be in the form of a polyamic acid when spin cast on a flat substrate and subsequently cured thermally to form a polyimide, such as Kapton™.

The contact lens 10 may comprise one or more components shown in FIG. 1. The elements or components of the electronic system, in the embodiments shown in FIG. 1 comprise a plurality of light sources 30 mounted on a bus, a microcontroller 38 (or other suitable form of processor or processing element) that comprises a power and data management system, an onboard memory and an RFID module, a sensor (not shown) that is designed to detect a physical or physiological trigger and issue a signal that turns the light sources 30 ON or OFF, an antenna 41 for wireless exchange of data that also functions as a wireless receiver of power and that is capable of operating on a single or multiple frequency bands for transmission and reception of data and power, and a rechargeable solid state Lithium ion battery 20. In some embodiments, the antenna 41 may comprise a coil comprising one or more turns, for example. In some embodiments, the microcontroller 38 comprises an application specific integrated circuitry ("ASIC"). The plurality of light sources 30 may comprise microscopic light sources 30 as described herein.

The light sources 30 can be positioned along a circumference of diameter in the range 1.5 mm to 5.0 mm from the center.

As will be described in further detail, microcontroller 38 may be configured to execute operations used to implement a state machine for the eCL. This eCL state machine may enable the eCL to be in one of a plurality of states or modes of operation. In some embodiments, these eCL states may include one or more of "charging", "resting" or "idle", "therapy", or "error". As an example of the operation, once the eCL detects a voltage from the eCL charging case, the eCL state machine will enter a charging state.

Charging Case

The eCL charging case as disclosed herein is suited for use with many types of eCLs. In some embodiments, the eCL case is configured to store the eCL submerged in a contact lens solution, and recharge the power source of the eCL, e.g., the battery 20 of the eCL.

The eCL charging case can be configured in many ways in accordance with the various embodiments as described herein. The case may comprise any suitable mechanical configuration of elements or components. In some embodiments, the charging case comprises integrated mechanical components, eCL charging electronics, and firmware coupled to the charging electronics to control the charging function. In some embodiments, the circuitry of the eCL charging case is configured to detect the presence of the eCL in the charging case and to charge the eCL in response to detecting the eCL in the charging case. The charging, detection, or other circuitry can be configured to use decreased amounts of power, e.g., to enter a passive sleep mode, when the contact lens is not detected. The circuitry can be configured to periodically activate to detect the presence or absence of the contact lens and either return to the passive mode if no contact lens is detected or to charge the contact lens in response to the contact lens being detected. The eCL charging case can be configured to run on power provided by batteries, such as two AAA batteries, for example. The charging case batteries may be of a disposable or rechargeable variety.

In some embodiments the circuitry contained within the eCL charging case comprises one or more of the following: a printed circuit board, an antenna, antenna driver circuitry, lens detection circuitry, and a processor such as a microcontroller unit ("MCU"), where each of these components may be located on the printed circuit board ("PCB"). The PCB may comprise a flexible PCB, for example.

In some embodiments, the eCL charging case may be configured with appropriate ergonomics and integrated components. Several mechanical configurations with different integration concepts and with different outer shapes are described in accordance with embodiments of the present disclosure. The inventors have conducted experiments, and prepared 3D-printed mockups of the contact lens charging cases as disclosed herein, in order to assess utility, ergonomics and beneficial shapes. The inventors have also conducted experiments and simulations to determine suitable characteristics and features of the eCL charging case in accordance with embodiments disclosed herein.

Although reference is made to preferred and beneficial design concepts, these are described and provided as examples in accordance with some embodiments.

FIGS. 1A and 1B show eCL cases 102 and 104 with watertight housings and covers placed thereon. Each eCL case may comprise a first container 110 with a label "R" 111 indicating an eCL to be placed into a right eye of a user and a second container 112 with a label "L" 113 indicating an eCL to be placed into a left eye of a user, with each container sized and shaped to receive an eCL. A removable cover 120 can be placed over each container, for example a threaded cover.

FIGS. 1C1 and 1C2 show a plurality of plastic (or other suitable material) contact lens containers and associated components. The plurality of contact lens containers can be configured to be removable and capable of being inserted into an aperture or other opening in the housing of the eCL charging case, as shown in FIGS. 1A and 1B.

Referring again to the exploded view of FIG. 1C2, each of the plurality of containers 132 and 134 comprises a cover 140, a protective barrier 150 (such as a foil or other membrane), an eCL 160, and a compartment 170 to receive the eCL. The protective barrier 150 can be provided to maintain sterility of the contact lens 160 within each container 132 and 134. In some embodiments, each of the sterile containers comprises a sterile contact lens and sterile solution contained therein with the protective barrier covering an opening to the container. Each of the compartments 170 may comprise a fitting or other coupling 180 such as a snap-fit coupling to reversibly couple the container to the charging case housing after insertion of the lower portion of the container through an aperture in the housing. The removable container allows the other components of the eCL charger to be reused when the lenses are replaced, for example replaced with sterile contact lenses.

The containers 132 and 134 may comprise a contact lens solution and can be provided to the patient in a sterile configuration with a sterile barrier 150 such as foil over the opening to the contact lens compartment. The contact lens 160 within the compartment 170 may comprise a sterile contact lens and be immersed in a sterile contact lens solution. The protective sterile barrier 150 (such as the foil) can be removed when using the eCL 160 for the first time. The container 132 and 134 can be shipped with sterile contact lens solution in the container with the eCL. Once the container has been inserted into the aperture and placed in the housing of the charging case, the cover can be removed, the sterile barrier material removed, and the eCL removed and placed on the patient's eye. In some embodiments, the sterile eCL is (re)charged prior to removal from the container.

Once the eCL has been worn, the eCL can be placed in the container and recharged as described herein. The eCL can be used for a suitable time and then replaced with a new container and eCL as appropriate.

The eCL charging case can be configured for ease of use. The case may comprise a suitable exterior size and shape such that the case is ready for use and can be easily carried in a pocket, purse, or bag to be handy and ready for use.

In some embodiments, the entire case is configured to be capable of being submerged in water and may comprise an ingress protection ("IP") code of IP67 rating, i.e., the unit can be placed in a body of water up to one meter in depth for half an hour, without harm to the internal electronics. The housing may comprise a material with an IP67 rating, and a suitable gasket or gaskets can be used to provide the eCL charging case with the IP67 rating when the containers have been placed in the housing apertures. The eCL case comprises any suitable number of containers, for example two eCL compartments, each configured to receive a single contact lens.

Each of the plurality of containers may comprise a standard sized plastic container. In some embodiments, each of the plurality of containers can be placed in a right eye receptacle or a left eye receptacle of the eCL charging case, where each of the receptacles comprises an aperture and a coupling (such as a snap coupling or other suitable coupling) to retain the container in the case, as described herein. Alternatively or in combination, a container with a contact lens for the right eye can be configured to be able to be placed only in the corresponding right receptacle and aperture, and a container with a contact lens for the left eye can be configured to be able to be placed only in the corresponding left receptacle and aperture.

A set of two contact lens can be individually put together in the case, and each eCL in the case can be configured to correct the refractive error of the corresponding eye, e.g., the left eye or the right eye.

The eCL charging case can be configured with any suitable number of antennas, e.g., coils, to provide a capability of charging the corresponding eCL lens or lenses. The eCL charger will typically comprise two charging coils, with one charging coil being used to charge the contact lens for each eye. The compartment containing the lens and the charging coil can be arranged in many ways as described herein, for example the charging coil may be placed under the compartment, or the compartment may be inserted at least partially through the charging coil.

The eCL charging case can be configured with an appropriate power supply and circuitry to provide autonomy for about 1 month with appropriate batteries, such that the case can recharge the contact lenses without case battery replacement or recharging for at least about one month. The batteries may comprise disposable or rechargeable batteries. The eCL charging case may comprise appropriate circuitry such as firmware and/or corresponding processor instructions for the microcontroller to charge the eCL in response to the eCL being placed in the compartment as described herein.

FIGS. 2A to 2E show an initial preparation of the eCL charging case 202. Each of the steps shown can be performed by the patient or an eye care professional or a suitable combination thereof.

FIG. 2A shows removal of battery activation strip 210. The battery activation strip may comprise a dielectric material configured to prevent the eCL charging case 202 from operating prior to the intended use, for example while the eCL charging case is being stored or shipped prior to use. Removal of the battery activation strip 210 allows the power source (such as batteries) to provide power to the eCL circuitry as described herein.

FIG. 2B shows placing eCL compartments 220 and 222 onto or into an eCL case 202 comprising a charger, where the charger comprises circuitry to enable wireless charging of the eCL. A compartment or container 220 holds an eCL for the left eye, while a corresponding compartment or container 222 holds an eCL for the right eye. The eCL compartments/containers may comprise sterile containers as described herein, for example with reference to FIG. 1C2, for example.

FIG. 2C shows the eCLs charging with the eCLs in the charging case 202.

The steps illustrated in FIGS. 2A to 2C may be performed by an eye care professional and/or the patient.

FIG. 2D shows how a user may remove a cover 230 and a protective sterile barrier material (such as foil) 232 in order to access the eCL for removal from the charging case 202. In some embodiments, the covers may be removed by unscrewing them from a threaded portion of a compartment.

FIG. 2E shows the eCL case 202 with the covers removed and the charged eCL 240 ready for removal and placement on the eye.

During typical use, the patient will perform the steps shown in FIGS. 2C to 2E, in accordance with some embodiments.

FIGS. 3A to 3E show an example use of the eCL, and these steps can be performed daily by the patient in order to charge the eCL, in accordance with some embodiments.

FIG. 3A shows an eCL placed in a charging case 302 for charging. This may occur at night while the patient sleeps, for example.

FIG. 3B shows removal of a cover 310 and the eCL 312 ready for removal and placement on the eye. As mentioned, in some embodiments, the covers may be removed by unscrewing them.

FIG. 3C shows the eCL 312 removed from the charging case and ready to be worn on the eye.

FIG. 3D shows the eCL container 320 after removal of the eCL and able to be rinsed and filled with contact lens solution.

FIG. 3E shows an eCL 312 placed in the correct compartment 330 (i.e., the left or right compartment corresponding to the appropriate eCL). After placement of the lenses in the compartments, the covers can be placed over the compartments and the eCLs charged.

The above steps can be repeated daily, as suggested by the arrow connecting FIG. 3E to FIG. 3A.

Figure 4A:
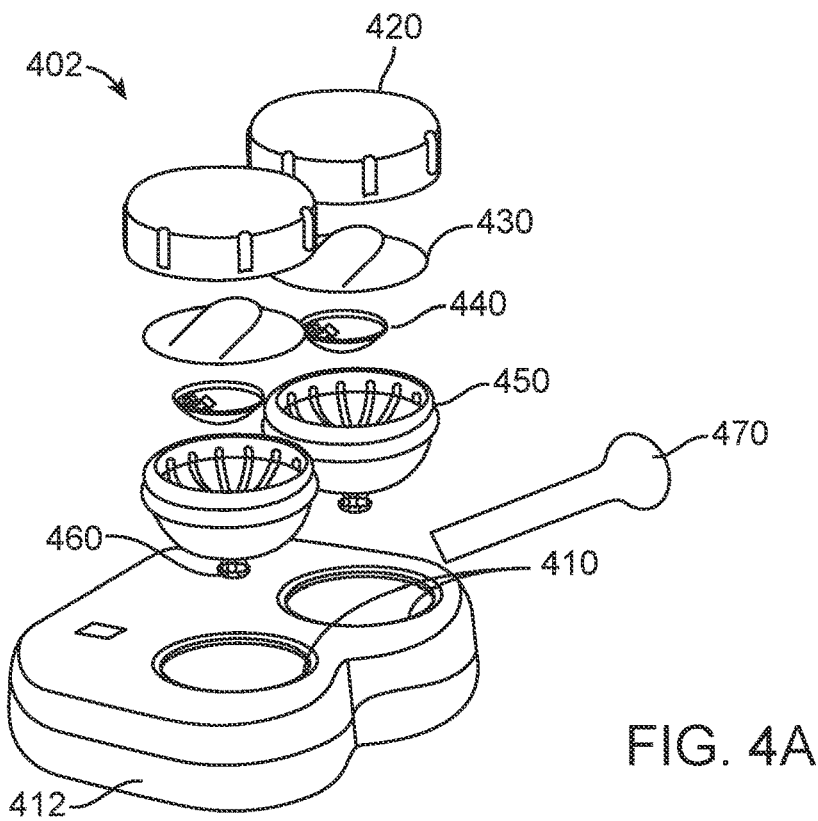
FIG. 4A shows an exploded view of the eCL charging case as in FIG. 1B and associated components, in accordance with some embodiments.

FIG. 4A shows an exploded view of the eCL charging case 402 of FIG. 1B (corresponding to integration concept 2 of FIGS. 9B, 9I, and 9P) and associated components. In some embodiments, the eCL case 402 may comprise a gasket 410 around each of the apertures in the case in order to seal the housing 412 and provide suitable resistance to and protection from water, e.g., to meet the IP67 standard as described herein.

Figure 4B:
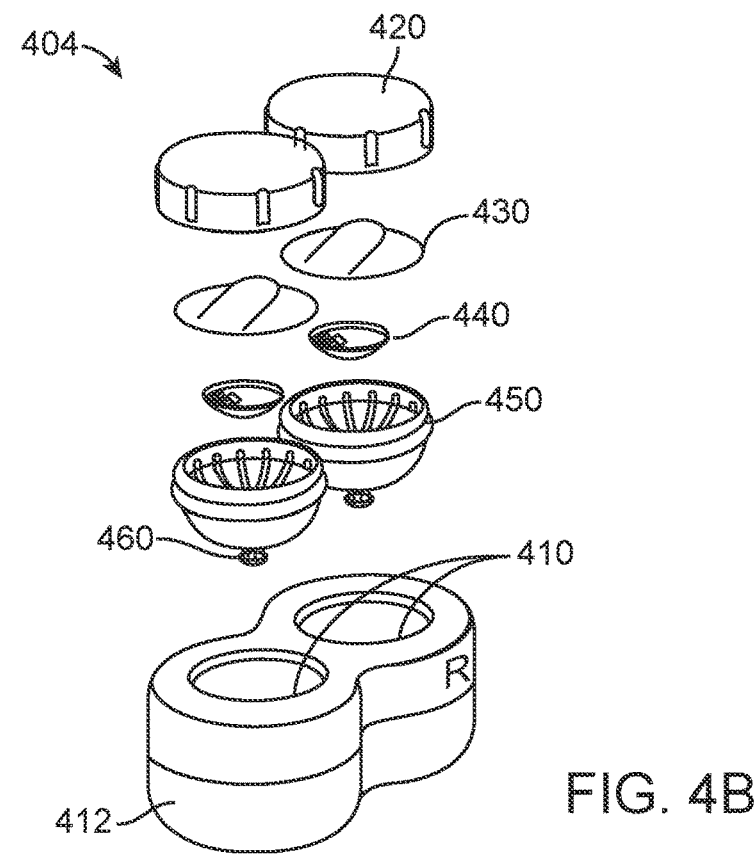
FIG. 4B shows an exploded view of the eCL charging case as in FIG. 1A and associated components, in accordance with some embodiments.

FIG. 4B shows an exploded view of the eCL charging case 404 of FIG. 1A (corresponding to integration concept 6 of FIGS. 9G, 9N, and 9U) and associated components. In some embodiments, the eCL case 404 may comprise a gasket 410 around each of the apertures in the case in order to seal the housing 412 and provide suitable resistance to and protection from water, e.g., to meet the IP67 standard as described herein.

As shown in FIGS. 4A and 4B, in some embodiments, the charging cases 402 and 404 may include a cover 420 for each compartment 450, a protective foil or other suitable material 430 for each compartment, an eCL 440 for placement into each compartment for charging and storing, and a snap-fit 460 or other means of reversibly connecting a compartment to the case. Some embodiments may include a strip 470 that may be removed to allow activation and use of the battery or batteries contained in case.

Figure 5A:
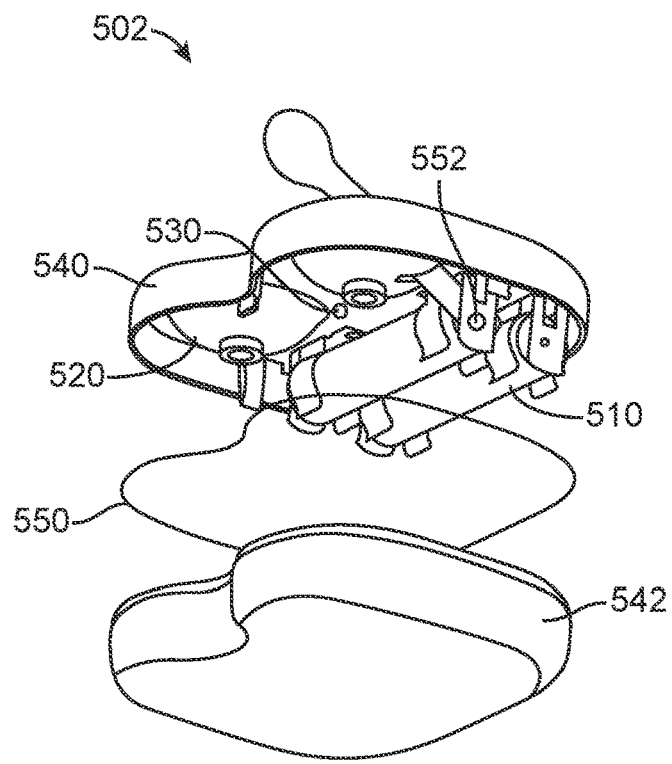
FIG. 5A shows an exploded underside view of the components of the eCL wireless coupling charger as in FIGS. 1B and 4A, in accordance with some embodiments.

FIG. 5A shows an exploded underside view of the components of the eCL wireless coupling charger 502 of FIGS. 1B and 4A. In accordance with the embodiment of integration concept 2 shown in FIG. 5A, the batteries 510 are located to the side of the compartments/containers 520. A printed circuit board ("PCB") 530 with charging antennas, e.g., coils, comprises a plurality of apertures sized and shaped to receive the compartments 520, such that the coils can extend at least partially around the compartments in which the eCLs are placed. A top part of the case housing 540 is configured with apertures to receive the compartments 520. A bottom part of the housing 542 is configured to engage the upper part of the housing 540 with a gasket 550 extending therebetween to provide water resistance, e.g., to at least the IP67 standard as described herein. The bottom part of the housing 542 may comprise a fitting to receive and engage the fitting of each of the compartments 520, e.g., a snap fitting formed on or attached to each of the compartments. A battery activation strip 552 is shown extending between the battery and the battery holder terminal so as to insulate the battery from contact with the terminal.

Figure 5B:
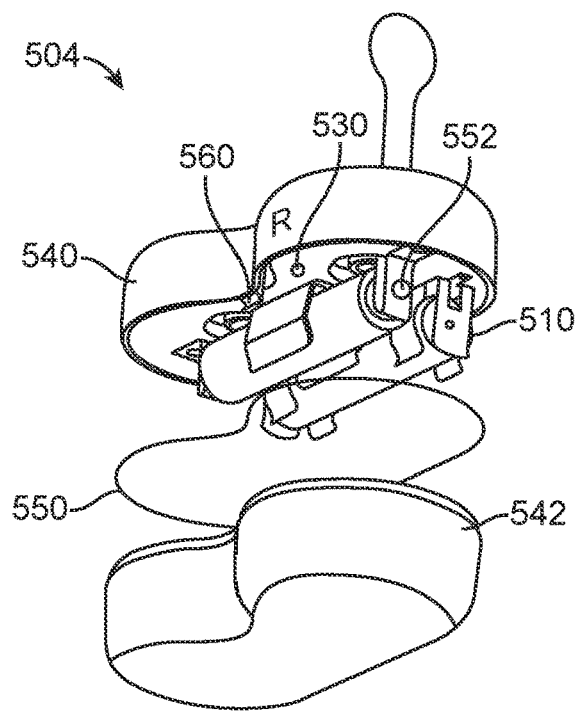
FIG. 5B shows an exploded underside view of the components of the eCL wireless coupling charger as in FIGS. 1A and 4B, in accordance with some embodiments.

FIG. 5B shows an exploded underside view of the components of the eCL wireless coupling charger 504 of FIGS. 1A and 4B. In accordance with the embodiment of integration concept 6 shown in FIG. 5B, the batteries 510 are located beneath the compartments/containers. A printed circuit board ("PCB") 530 with charging antennas, e.g., coils, is located beneath the plurality of compartments and above the batteries 510, so as to extend between the batteries and the plurality of compartments. A top part of the housing 540 is configured with apertures to receive the compartments. A bottom part of the housing 542 is configured to engage the upper part of the housing 540 with a gasket 550 extending therebetween to provide water resistance, e.g., to at least the IP67 standard as described herein. The bottom part of the housing 542 may comprise a fitting to receive and engage the fitting 560 of each of the containers, e.g., a snap fitting of each of the containers. A battery activation strip 552 is shown extending between the battery and the battery holder terminal so as to insulate the battery from contact with the terminal.

FIG. 6A shows a charging coil 602 positioned below an eCL compartment/container 610 as in FIG. 5B, in which the charging coil 602 comprises a maximum cross-sectional dimension (e.g., a diameter) greater than a maximum cross-sectional dimension (e.g., a diameter) of the eCL coil 604. In some embodiments, the charging coil 602 comprises a diameter greater than the coil of the eCL 604 and no more than the diameter of the compartment 610. In some embodiments, the charging coil 602 beneath the eCL compartment 610 comprises a diameter larger than the eCL compartment 610.

FIG. 6B shows a charging coil 622 positioned around an eCL compartment/container 630 as in FIG. 5A, in which the charging coil 622 comprises a maximum cross-sectional dimension (e.g., a diameter) greater than the maximum cross-sectional dimension of the eCL compartment 630 and the maximum cross-sectional dimension of the eCL coil 624. In some embodiments, the charging coil 622 is located on a PCB, such as a flexible PCB, and the PCB comprises an aperture sized to receive the compartment 630 that holds the eCL.

Although FIGS. 6A and 6B refer to the relative diameters of the charging coil and the eCL coil, in some embodiments, the coils may comprise non-circular shapes. The maximum cross-sectional dimension of the charging coil may comprise one or more of a diameter, a cross-sectional area, or a major axis of an ellipse, and the maximum cross-sectional dimension of the eCL coil may comprise one or more of a diameter, a cross-sectional area, or a major axis of an ellipse.

FIG. 6C shows results of a COMSOL simulation of the coupling parameter k (expressed as a percentage) between the charging coil and the eCL coil as a function of varying charger coil radius ($r_t$) in mm along the horizontal axis and axial coil separation distance ($d_z$) in mm along the vertical axis. The simulations were performed using finite element modeling software commercially available from COMSOL, Inc. of Burlington Mass., United States of America. The simulations shown in FIG. 6C assume no axial misalignment. These simulations show the coupling parameter k when sweeping (varying) the axial distance between the contact lens and the charging coil (which may be referred to as the TX coil) as a function of the radius of the charging coil, and assume no axial misalignment. As will be appreciated with reference to FIG. 6C, the closer the coils (i.e., the lower the axial separation), the better the coupling and as a result, the more efficient the energy transfer. For example, with an approximately 8 mm charging coil radius $r_t$, the coupling coefficient k is approximately 10.000 with an axial displacement $d_z$ of approximately 7 mm (as indicated by the region identified by arrow 640), while the coupling coefficient is approximately 35.000 with an axial displacement of approximately 1 mm. Alternatively, with an approximately 14.5 mm charging coil radius $r_t$, the coupling coefficient k is approximately 10.000 with an axial displacement $d_z$ of approximately 1 mm (as indicated by the region identified by arrow 642). In the figure, parameter combinations yielding an equal value of k are indicated by curves 650.

Figure 6D:
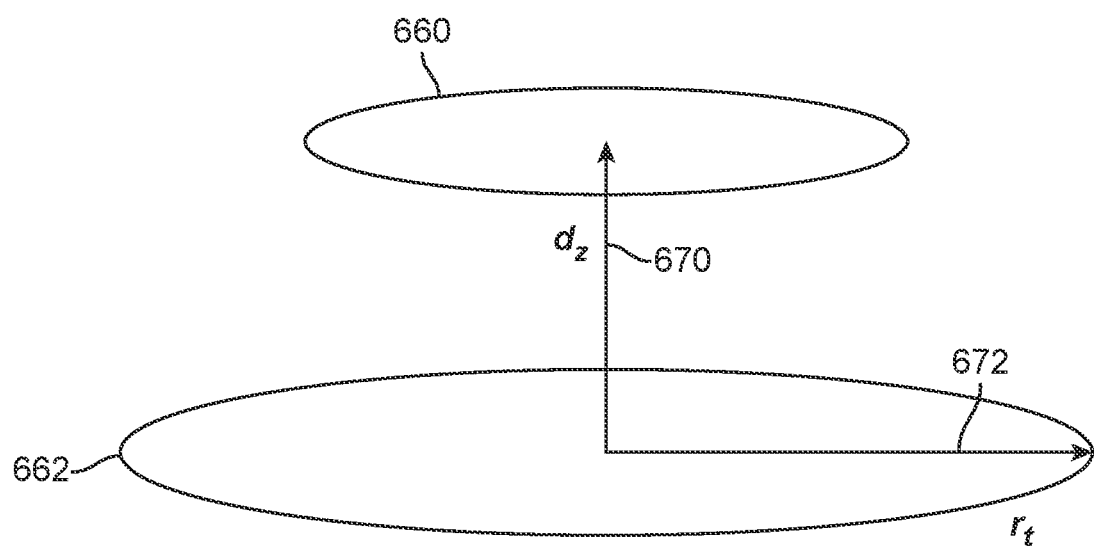
FIG. 6D shows the arrangement of the eCL and charger coils and associated parameters $d_z$ and $r_t$ for the simulations of FIG. 6C, in accordance with some embodiments.

FIG. 6D shows the arrangement of the eCL 660 and charging 662 coils and the associated parameters $d_z$ 670 and $r_t$ 672 as used for the simulations of FIG. 6C.

FIGS. 7A to 7E show example positions of the eCL in the compartment/container in relation to the charging coil.

Figure 7A:
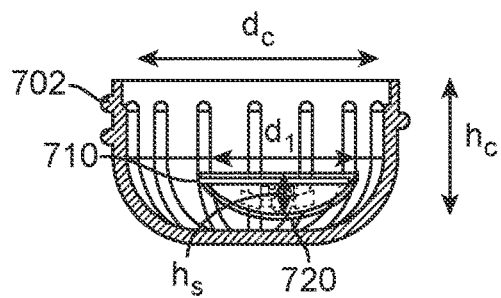
FIG. 7A shows dimensions of the eCL charging case to determine the position and orientation sensitivity of coils, in accordance with some embodiments.

FIG. 7A shows example variables and dimensions of an embodiment of the eCL charging case compartments 702 that may be used in determining the position and orientation sensitivity of the charging and eCL 710 coils. In some embodiments, the compartment 702 comprises a diameter de within a range from 15 mm to about 30 mm, for example 24 mm. The height $h_c$ of the compartment can be within a range from about 5 mm to about 20 mm, for example about 13.3 mm. The eCL 720 may comprise a diameter di within a range from about 10 mm to about 17 mm, for example 13.5 mm. A sag height $h_s$ of the contact lens may comprise a vertical distance between the vertex of the contact lens and the outer perimeter of the contact lens. The sag height between the vertex of the contact lens and the eCL coil 710 can be within a range from about 2 mm to about 5 mm, for example about 3.3 mm.

Figure 7B:
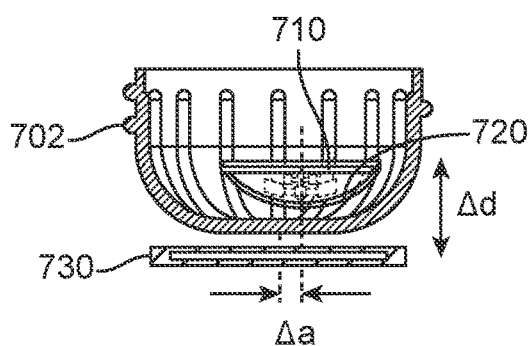
FIG. 7B shows the charging coil below an eCL container as in FIG. 6A with a translational offset Δa between a center of the charging coil and a center of the eCL coil, and a separation distance Δd between the center of the charging coil and the center of the eCL coil, in accordance with some embodiments.

FIG. 7B shows the charging coil 730 below an eCL compartment 702 as in FIG. 6A, with a translational offset Δa between a center of the charging coil and a center of the eCL coil, and a separation distance Δd between the center of the charging coil and the center of the eCL coil 710.

Figure 7C:
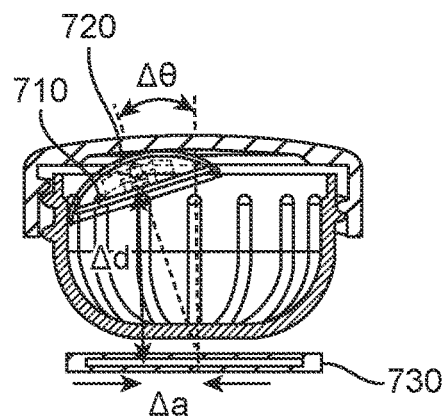
FIG. 7C shows a different translation and offset as compared with FIG. 7B and a rotational angle Δθ between an axis of the charging coil and an axis of the eCL coil, in accordance with some embodiments

FIG. 7C shows a different translational offset Δa and separation distance Δd as compared with FIG. 7B, and a rotational angle Δθ between an axis of the charging coil 730 and an axis of the eCL coil 710.

Figure 7D:
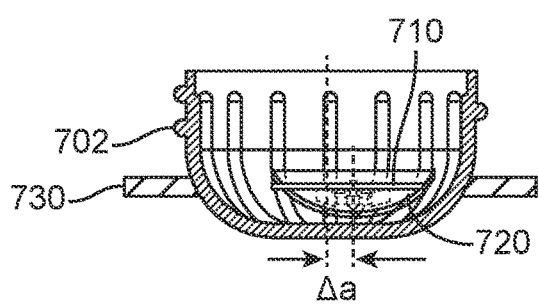
FIG. 7D shows the charging coil around an eCL container as in FIG. 6B with a translational offset Δa between a center of the charging coil and a center of the eCL coil, and a separation distance Δd between the center of the charging coil and the center of the eCL coil, in accordance with some embodiments.

FIG. 7D shows the charging coil 730 around an eCL compartment 702 as in FIG. 6B, with a translational offset Δa between a center of the charging coil 730 and a center of the eCL coil 710, and a separation distance Δd of zero between the center of the charging coil 730 and the center of the eCL coil 710.

Figure 7E:
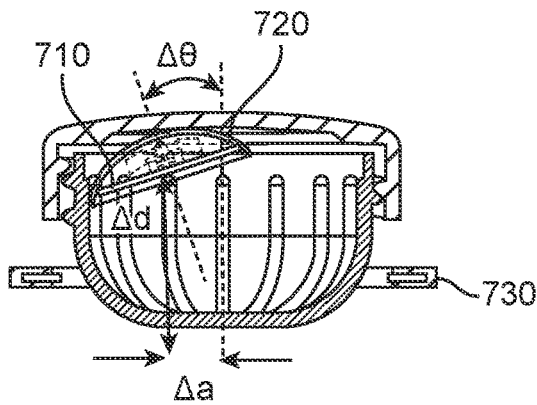
FIG. 7E shows a different translation and offset as compared with FIG. 7D and a rotational angle Δθ between an axis of the charging coil and an axis of the eCL coil, in accordance with some embodiments.

FIG. 7E shows a different translational offset Δa and separation distance Δd as compared with FIG. 7D, and a rotational angle Δθ between an axis of the charging coil 730 and an axis of the eCL coil 710.

Based on the parameters described for FIGS. 7A to 7E, the inventors have conducted simulations suggesting that the eCL can be charged with the following values for the indicated variables or parameters:

For the charging coil positioned below the eCL compartment, the following parameter ranges can be used:

Δa: from 0 to approximately 5 mm, with a maximal value of 6 mm;

Δd: from approximately 2 mm to a maximal value of 8 mm; and

Δθ: angles preferably no more than 45°.

For the charging coil positioned around the eCL compartment, the following parameter ranges can be used:

Δa: from 0 to approximately 8 mm;

Δd: from 0 mm to 6 mm; and

Δθ: angles preferably no more than 45°.

A person of ordinary skill in the art can conduct experiments to determine additional and/or alternative configurations and parameters.

The present inventors have evaluated several concept designs in accordance with the embodiments described herein. FIG. 8A shows a concept number and 3D view of the charging case 800 for Concept 1. The figure shows the case housing 802, including compartments for a left (L) lens 806 and a right (R) lens 804, and the covers for each compartment.

FIG. 8B shows an integration approach for two AAA batteries 810, the lens compartments 804 and 806 and the charging coils 820, as in FIG. 8A.

FIG. 8C shows the dimensions of the example charging case 800 of FIGS. 8A and 8B. In some embodiments, the charging case 800 comprises a length $l_c$ within a range from about 60 mm to about 90 mm, for example about 75 mm, a width we within a range from about 45 mm to about 75 mm, for example about 60 mm, and an overall height $h_c$ including the covers 830 within a range from about 20 mm to about 40 mm, for example about 30 mm. In some embodiments, the height of the case without the removable covers hic is within a range from about 10 mm to about 30 mm, for example about 20 mm.

The power source can be configured in multiple ways and may comprise a rechargeable or disposable power source. Although reference herein is made to batteries, the power source may comprise a charger plugged into an outlet such as a 110 V outlet or a 220 V outlet, for example. Alternatively, or in combination, the charger may be plugged into a low voltage source of electrical energy such as a 5 V power source, e.g., universal serial bus (USB) or a 12 V power supply, such as a car battery.

As a power source such as two AAA-batteries may comprise larger components, the configuration of the eCL charging case and housing can be sized and shaped in consideration of the positioning of two batteries within the charging case. Additionally, the charging coils can be configured close to the eCL (either below or around the eCL compartments, as described herein).

FIGS. 9A through 9U show the case shapes for the integration options of the considered components, i.e., batteries and PCB (comprising the charging coils) for concepts 1, 2, 3a, 3b, 4, 5 and 6. Each of these drawings shows a concept number, a 3D view of the case, an integration approach for the two AAA batteries and the charging coils, the lens compartments, the compartment covers, the apertures in the PCB through which the compartments fit, and the main dimensions of the case. The dimensions for each option include a case length $l_c$, a case width $w_c$, a case height with the covers in place $h_c$ and without the covers being considered hic. Concept 5 further includes the height of a feature $h_f$ used to house one of the batteries. Each of the concepts also indicates a right (R) and a left (L) label indicating which lens fits into the labeled compartment.

FIGS. 9A, 9H and 9O show Concept 1 900, which has two batteries 902 with the batteries disposed on opposite sides of the compartments 904, and with the compartments extending at least partially through apertures in the PCB 906 and through the planes of the two charging coils. For concept 1, the case 901 length $l_c$ is within a range from about 60 mm to about 90 mm, for example about 75 mm, the case width we is within a range from about 50 mm to about 70 mm, for example about 60 mm, the case height with the covers 908 in place $h_e$ is within a range from about 25 mm to about 35 mm, for example about 30 mm, and the case height without the covers being considered hic is within a range from about 15 mm to about 25 mm, for example about 20 mm.

FIGS. 9B, 9I and 9P show Concept 2 910, which has two batteries 912 with the batteries disposed on the same side of the compartments 914, and with the compartments extending at least partially through apertures in the PCB 916 and through the planes of the two charging coils. For concept 2, the case length $l_c$ is within a range from about 60 mm to about 90 mm, for example about 75 mm, the case width we is within a range from about 50 mm to about 70 mm, for example about 60 mm, the case height with the covers 918 in place $h_e$ is within a range from about 25 mm to about 35 mm, for example about 30 mm, and the case height without the covers being considered hic is within a range from about 15 mm to about 25 mm, for example about 20 mm.

FIGS. 9C, 9J and 9Q show Concept 3a 920, which has two batteries 922 with the batteries disposed between the compartments 924, and with the compartments extending at least partially through the apertures in the PCB 926 and through the planes of the two charging coils. From the top view of FIG. 9Q, it can be seen that the housing comprises an approximately triangular shape. For concept 3a, the case length $l_c$ is within a range from about 80 mm to about 105 mm, for example about 93 mm, the case width we is within a range from about 45 mm to about 65 mm, for example about 53 mm, the case height with the covers 928 in place $h_e$ is within a range from about 25 mm to about 35 mm, for example about 30 mm, and the case height without the covers being considered hic is within a range from about 15 mm to about 25 mm, for example about 20 mm.

FIGS. 9D, 9K and 9R show Concept 3b 930, which has two batteries 932 with the batteries disposed between the compartments 934, and with the compartments extending at least partially through the apertures in the PCB 936 and through the planes of the two charging coils. From the top view of FIG. 119Q119R, it can be seen that the housing comprises an approximately rectangular shape. For concept 3b, the case length 1c is within a range from about 80 mm to about 105 mm, for example about 95 mm, the case width we is within a range from about 45 mm to about 65 mm, for example about 53 mm, the case height with the covers 938 in place he is within a range from about 25 mm to about 35 mm, for example about 30 mm, and the case height without the covers being considered hlc is within a range from about 15 mm to about 25 mm, for example about 20 mm.

FIGS. 9E, 9L and 9S show Concept 4 940, which has two batteries 942 with the batteries disposed transversely to each other, for example arranged perpendicularly to each other. One of the batteries extends between the compartments 944. The compartments extend at least partially through an aperture in the PCB 946 and through the planes of the two charging coils. For concept 4, the case length $l_c$ is within a range from about 70 mm to about 90 mm, for example about 83 mm, the case width $w_c$ is within a range from about 55 mm to about 75 mm, for example about 63 mm, the case height with the covers 948 in place $h_c$ is within a range from about 25 mm to about 35 mm, for example about 30 mm, and the case height without the covers being considered hic is within a range from about 15 mm to about 25 mm, for example about 20 mm.

FIGS. 9F, 9M and 9T show Concept 5 950, which has two batteries 952 with the batteries disposed on top of each other between the containers 954, and with the containers extending at least partially throughs apertures in the PCB 956 and through the planes of the two charging coils. For concept 5, the case length $l_c$ is within a range from about 80 mm to about 100 mm, for example about 90 mm, the case width $w_c$ is within a range from about 50 mm to about 70 mm, for example about 57 mm, the case height with the covers 958 in place $h_c$ is within a range from about 25 mm to about 35 mm, for example about 30 mm, the case height without the covers being considered hic is within a range from about 15 mm to about 25 mm, for example about 20 mm, and the height $h_f$ of the feature used to house one of the batteries is within a range from about 25 mm to about 40 mm, for example about 32 mm.

FIGS. 9G, 9N and 9U show Concept 6 960, which has two batteries 962 with the batteries disposed beneath the compartments 964, and with the compartments located above the PCB 966 and in proximity to the PCB. For concept 6, the case length $l_c$ is within a range from about 65 mm to about 85 mm, for example about 73 mm, the case width $w_c$ is within a range from about 30 mm to about 50 mm, for example about 39 mm, the case height with the covers 968 in place $h_c$ is within a range from about 30 mm to about 50 mm, for example about 39 mm, and the case height without the covers being considered hic is within a range from about 20 mm to about 40 mm, for example about 29 mm.

Figure 10C:
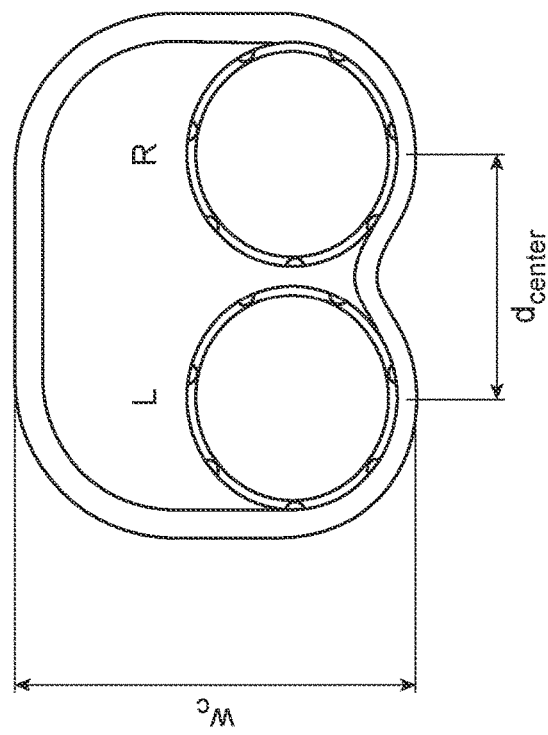
FIGS. 10A, 10B, and 10C show Concept 2, in accordance with some embodiments.
Figure 10A:
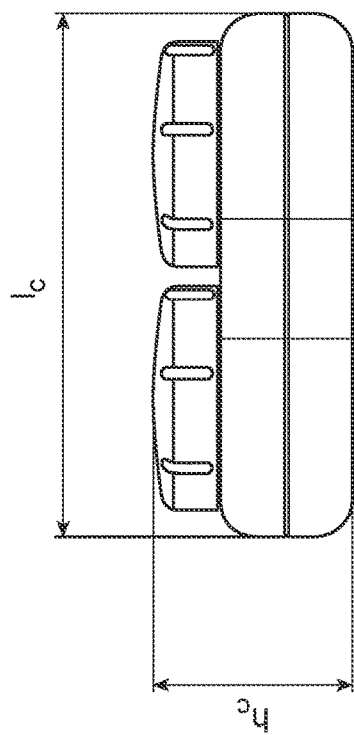
Figure 10B:
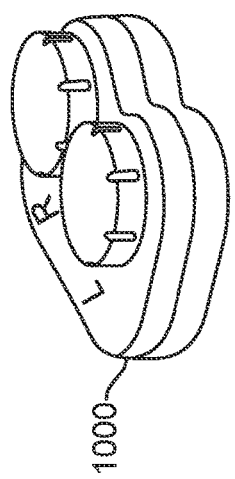

FIGS. 10A, 10B, and 10C show an example of the eCL charging case of Concept 2 and the associated dimensions. In some embodiments, the charging case 1000 comprises a length $l_c$ within a range from about 60 mm to about 90 mm, for example about 71 mm, a width we within a range from about 45 mm to about 75 mm, for example about 59 mm, and an overall height including the covers $h_c$ within a range from about 20 mm to about 40 mm, for example about 29 mm. The plurality of apertures to receive the compartments are located at a center-to-center distance $d_{center}$ from each other within a range from about 20 mm to about 40 mm, for example about 33 mm.

FIGS. 11A, 11B, and 11C show an example of the eCL charging case of Concept 6 and the associated dimensions. In some embodiments, the charging case 1100 comprises a length $l_c$ within a range from about 60 mm to about 90 mm, for example about 73 mm, a width we within a range from about 35 mm to about 75 mm, for example about 39 mm, and an overall height including the covers $h_c$ within a range from about 20 mm to about 40 mm, for example about 37 mm. The plurality of apertures to receive the compartments are located at a center-to-center distance $d_{center}$ from each other within a range from about 20 mm to about 40 mm, for example about 33 mm.

The embodiments shown with respect to FIGS. 10A to 10C comprise one or more of the following features: substantially flat, can be put in a trouser pocket, can be easily opened, and have a curved asymmetric shape. These embodiments may comprise a larger footprint as compared with the embodiments shown with respect to FIGS. 11A to 11C.

The embodiments shown with respect to FIGS. 11A to 11C comprise one or more of the following features: compact, a more stylish appearance, portable, can be easily opened, and have a curved asymmetric shape.

In some embodiments, the contact lens charging case as described herein may comprise one or more of the following features, in accordance with feedback and preferences received from contact lens wearers:

Left/Right side easily recognizable, for example by an asymmetric shape/colors/different surface textures and/or labels;

Liquid should flow off easily and not accumulate, for example to avoid bacteria growth and for reason of convenience;

Flat bottom, which allows the eCL case to be readily positioned on a flat surface;

Side wall close to cover, so as to provide enough space for fingers and thumb to grasp the cover and remove it; and/or Grooves inside contact lens compartment for hard contact lens to be able to remove it more easily.

Based on the teachings and disclosure provided herein, a person of ordinary skill in the art is capable of conducting tests and/or simulations to determine the coupling efficiency between the charging coil and the eCL coil for situations where the eCL is placed in different positions inside the compartment and to determine the influence of the induced magnetic field on the contact lens solution.

In some embodiments, the eCL charging case may comprise one or more of the following features:

Capable of Charging Overnight;

A 1-hour charging period to fully charge the 2×5 uAh contact lens charging case batteries;

Capable of performing a quick recharge, e.g., within about 10 mins, to keep the batteries of the charging case sufficiently (re)charged for use to charge the eCL for daily use;

Circuitry to detect the presence of a contact lens in the container/case;

Operates in 13.56 MHz ISM band; and

Safe to operate without causing interference in all ITU (International Telecommunication Union) regions.

The eCL charging case can be configured with an appropriate power consumption (a power "budget") to allow the eCL charging case to be powered by standard sized AAA alkaline cells (e.g., 2×1200 mAh), in accordance with embodiments.

The power budget may comprise one or more of the following features: during charging period: max. 100 mW; or during idle mode: max. 1 mW.

In some embodiments, the lens compartments comprise sterile lens compartments and other portions of the charging case may be non-sterile. For example, the primary packaging of the lens can be sterile prior to the protective sterile barrier being removed as described herein.

Figure 12:
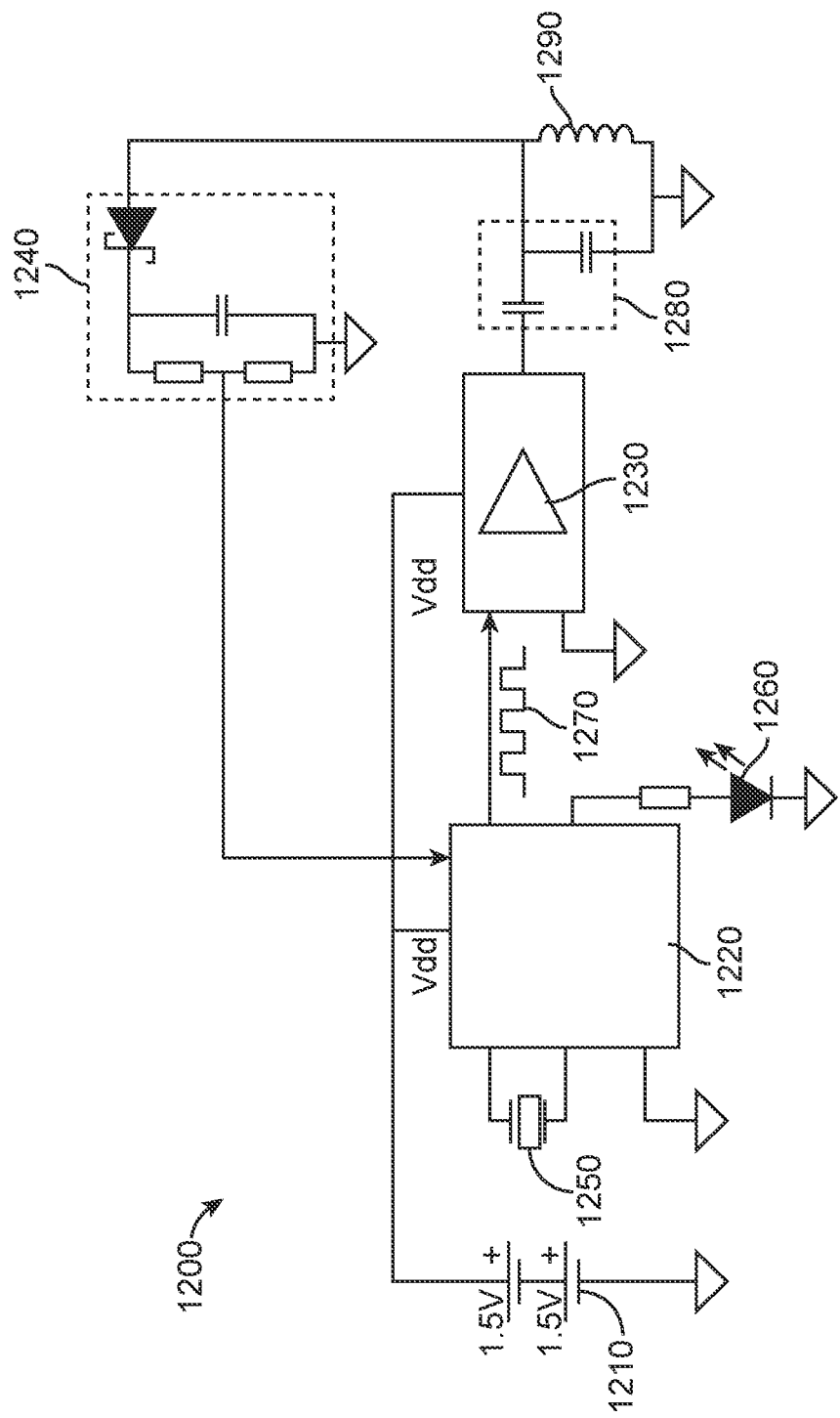
FIG. 12 shows the system architecture of the circuitry of the eCL charging case, in accordance with some embodiments.

FIG. 12 shows a system architecture or design 1200 for the circuitry of an eCL charging case, in accordance with some embodiments. In this example circuit, a power source such as batteries 1210, e.g., two AAA cells, is coupled to a processor 1220, such as a microcontroller unit (MCU). The MCU 1220 is coupled to an amplifier circuit 1230, an eCL detection circuit (e.g., in the figure illustrated as a diode combined with an RC network) 1240, and a clock signal generator, such as an external crystal 1250 or other oscillator. In some embodiments, the MCU is coupled to a status LED 1260. The processor (MCU) 1220 is configured to transmit a clock signal (e.g., a signal at 13.56 MHz) 1270 as an input to the amplifier circuit 1230. The amplifier circuit 1230 amplifies the clock signal 1270. The output of the amplifier circuit is coupled to a matching network (e.g., a pair of capacitors arranged in series) 1280, which is operatively coupled to a charging coil 1290 as described herein. The processor (MCU) 1220 can be configured to perform logic functions, such as detecting placement of a lens within a compartment of the charging case from an output of the lens detection circuitry 1240. As will be appreciated by one of skill in the art, other components and other values for the components shown may be used in constructing the circuit without departing from the concepts described herein.

Figure 13:
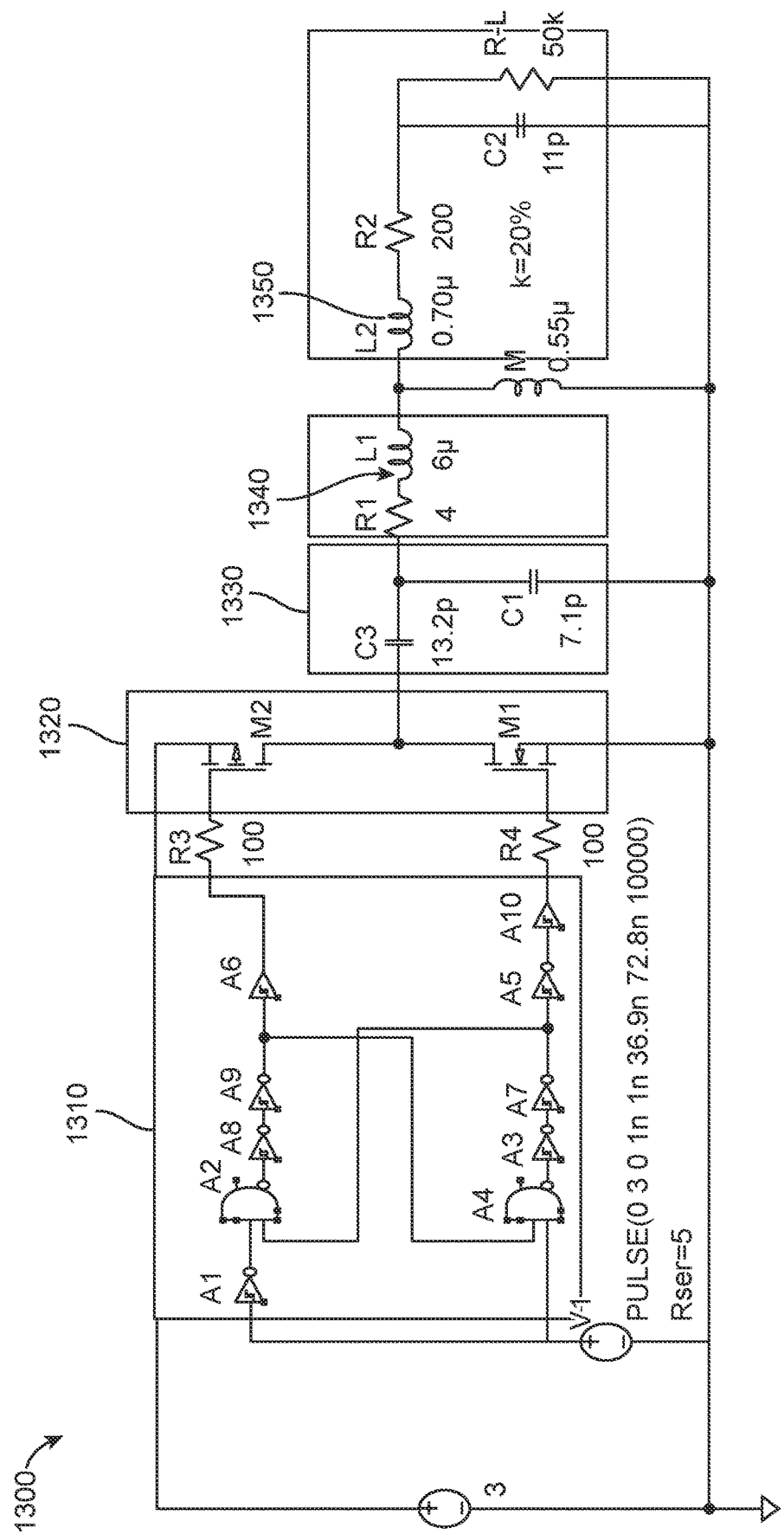
FIG. 13 shows antenna driver design I, in accordance with some embodiments.

FIG. 13 is a circuit diagram for an antenna amplifier and driver circuit of a first driver design 1300, which is configured to receive a clock signal and drive a charging coil as described herein with reference to FIG. 12. As illustrated, the amplifier receives the clock signal from the MCU, e.g., a 13.566 MHz clock signal, although any suitable frequency can be used. A gate driver 1310 of the amplifier circuit receives the clock signal. The gate driver 1310 may be comprised of logic gates A2 and A4 coupled to a rectifier network A1, A3, A5, A6, A7, A8, A9, and A10 as shown in the figure. The gate driver is coupled to a half-bridge topology circuit 1320 comprising a complementary P/N-MOSFET pair (M1 and M2 in the figure). The half-bridge circuit 1320 outputs a signal to the matching network 1330 comprised of capacitors C1 and C3, which is coupled to the charging coil 1340. The charging coil is coupled to the eCL coil 1350 as described herein. In some embodiments the gate driver may be configured with dead-time generation and with discrete logic components, and a buffer to charge the gates of the MOSFETs. In one example, the charging coil 1340 may comprise 24 windings of a suitable wire around a 16 mm diameter core. In one example, the eCL coil 1350 may comprise 6 windings of a suitable wire around a 12 mm diameter core. The eCL circuitry may also include the other components shown, some of which may form a RC network. As will be appreciated by one of skill in the art, other components and other values for the components shown may be used in constructing the circuit without departing from the concepts described herein.

Figure 14:
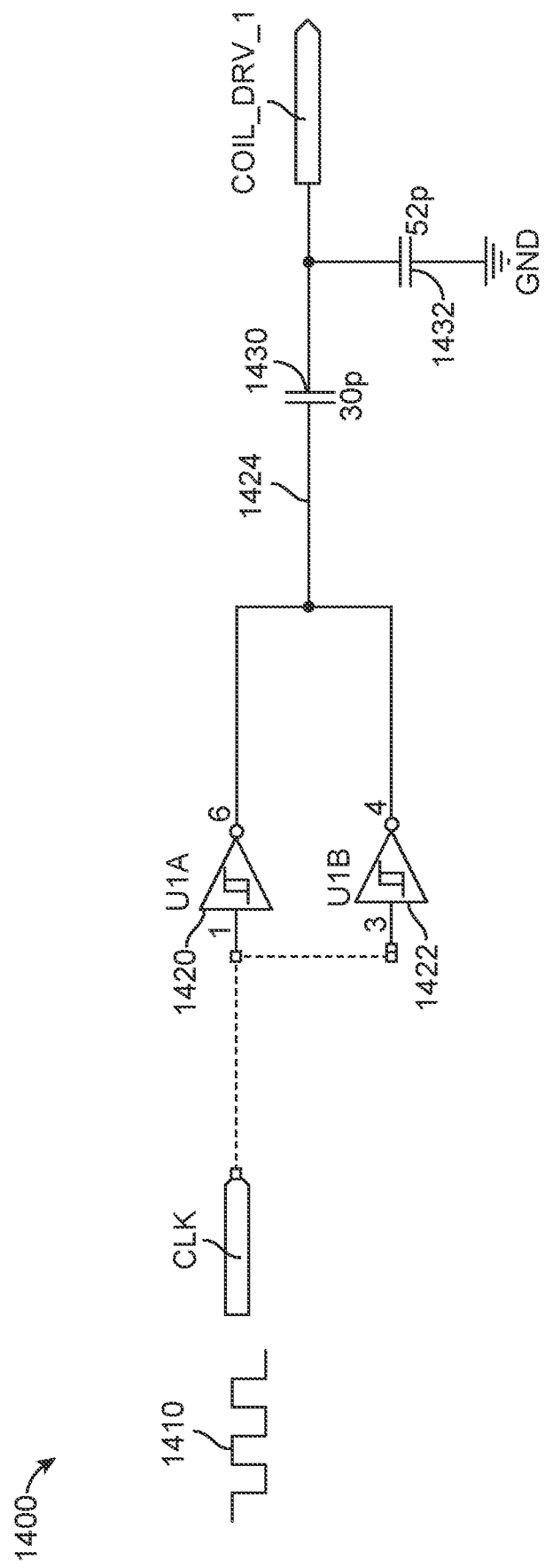
FIG. 14 shows antenna driver design II, in accordance with some embodiments.

FIG. 14 is a circuit diagram for an antenna driver of a second design 1400. In this embodiment, the antenna driver amplifier may comprise a commercially available buffer integrated circuit ("IC"). The input clock signal 1410 is coupled to the input of the buffer integrated circuit. The buffer integrated circuit may comprise a commercial buffer IC with a maximum current of 32 mA; for example, part number NL27WZ14DFT2G or a similar one commercially available from ON Semiconductor. In some embodiments, two buffers in parallel 1420 and 1422 (as shown in the figure) may be configured to deliver enough current to drive the charging coil (not shown). The output of the buffer IC(s) 1424 may be coupled to a matching network comprised of two capacitors 1430 and 1432, which is coupled to the charging coil. The charging coil can be coupled to the antenna coil of the eCL in the charging case compartments in one of the ways described herein. As will be appreciated by one of skill in the art, other components and other values for the components shown may be used in constructing the circuit without departing from the concepts described herein.

The antenna coil can be configured in different ways, and may comprise any suitable diameter, number of turns, coupling parameter k, and cross-sectional thickness of trace along the coil.

Two relevant parameters of the charging coil and the antenna coil of the eCL are the coil diameter and coil inductance. The coil diameter has a direct influence on the coupling parameter, k. The higher the coupling parameter k, the more efficient the power linkage/transfer between the charging coil and the eCL coil will be. The coupling parameter k is influenced by the distance between the coils and the difference between the contact lens coil radius (7 mm) and the charging coil radius.

The coil inductance is related to the number of turns of the coil. There is a tradeoff between the inductance and the constraints on the components of the frequency matching network. The higher the inductance of the coil, the stronger the magnetic field at the same current level and the better the efficiency of the coupling. However, the higher the inductance of the coil, the smaller the matching capacitor and the accuracy/precision of the matching capacitor becomes more relevant.

In some embodiments the matching capacitor is within a range from about 50 pF to about 100 pF.

The inductance of the coil can be calculated with the following formula:

$$L_{ant} = \frac{1}{\omega^2 * C} \rightarrow L_{ant\_100pF} = 1.4 uH, L_{ant\_50pF} = 2.8 uH$$

Where $L_{ant}$ is the inductance of the charging or eCL antenna coil, $\omega^2$ is the frequency squared, and C is the capacitance of the matching capacitor.

In some embodiments, with a matching capacitor of 100 pF, the coil comprises an inductance of 1.4 uH, whereas with a capacitance of 50 pF, the inductance comprises 2.8 uH.

An antenna coil with a 32 mm diameter (around the storage container) and 4 turns comprises an inductance of approximately 1.2 uH.

An antenna coil with a 32 mm diameter (around the storage container) and 6 turns comprises an inductance of approximately 2.3 uH.

Figure 15:
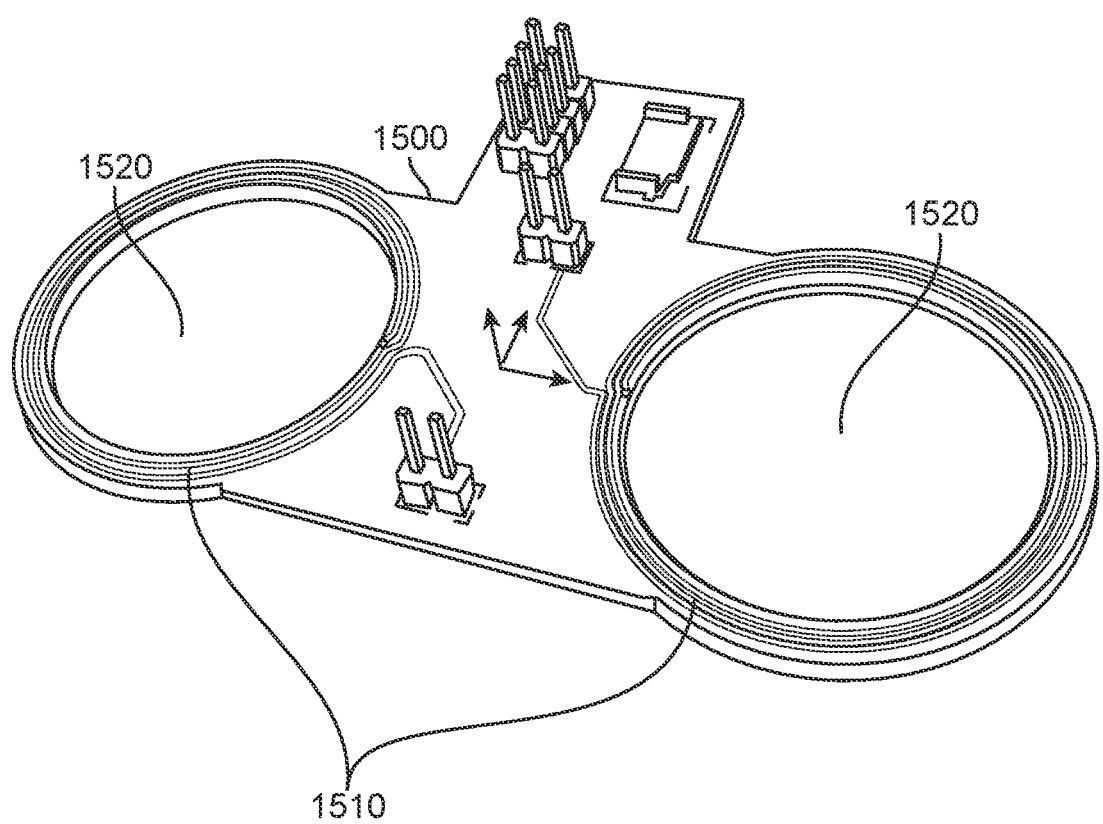
FIG. 15 shows a PCB coil with two coils and two apertures, in accordance with some embodiments.

FIG. 15 shows a PCB 1500 with two coils 1510 located thereon and two apertures 1520 sized to receive the contact lens compartments as described herein. The PCB 1500 can be sized and shaped to fit in a charging case housing and may comprise one or more circuitry components as described herein.

The inductance of the coil may comprise any suitable inductance, for example within a range from about 0.5 uH to about 6 uH, and the range can be from 1 uH to about 3 uH, for example. The number of turns of the coil can be within a range from 1 turn to about 10 turns, for example a range from 4 turns to 8 turns.

Figure 16:
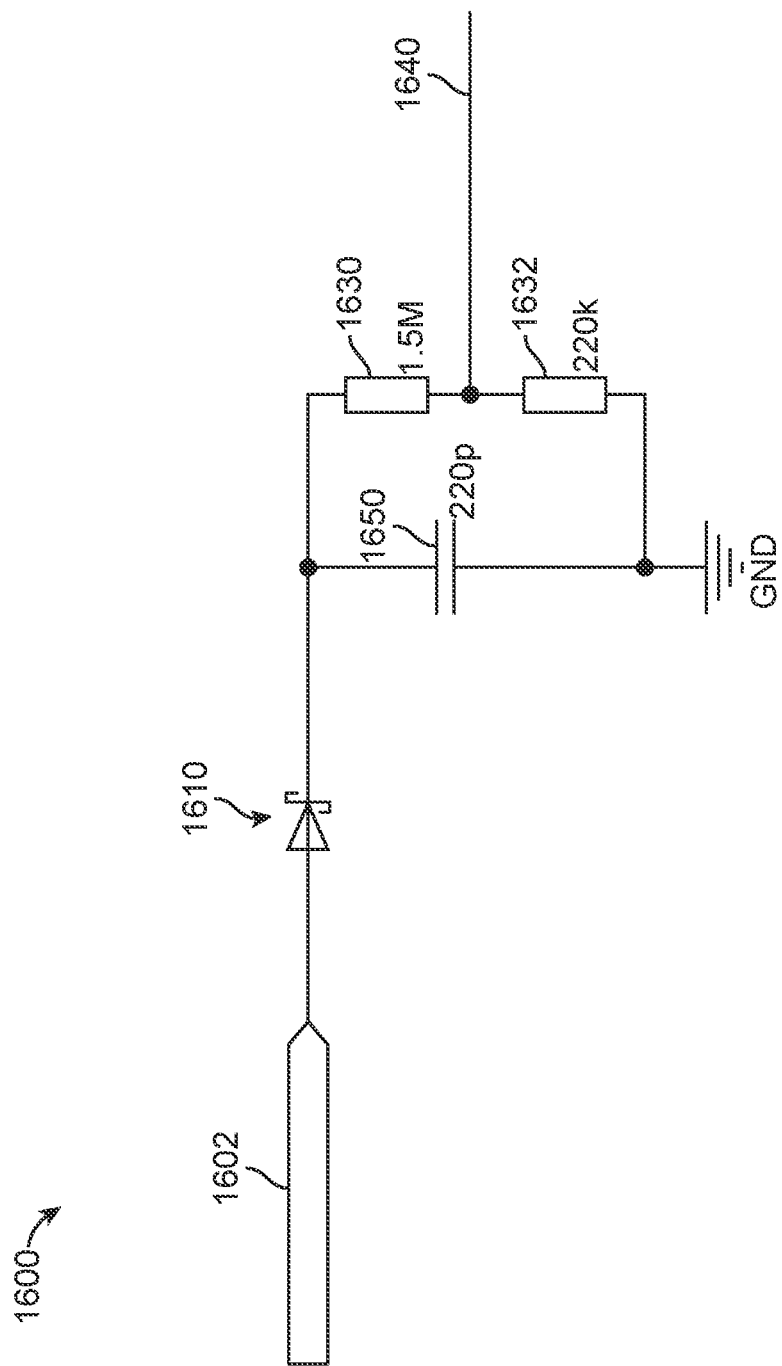
FIG. 16 shows a lens detection circuit, in accordance with some embodiments.

FIG. 16 is a diagram for a circuit 1600 to detect the presence of the eCL coil in the compartment. The circuit 1600 can be configured to detect the voltage change in the primary (charging) antenna coil when a secondary coil (in this case the eCL coil) is inserted into the magnetic field of the primary antenna coil. The circuit can be coupled to the coil driver 1602 and the processor or controller, such as the MCU. The circuit 1600 may comprise a rectifying diode 1610 such as a high frequency HF Schottky diode to rectify the voltage from the coil driver 1602. The coil voltage is rectified and the resulting DC voltage is shifted down to the processor's input analog-to-digital conversion ("ADC") range, e.g., the MCUs ADC input range, with a voltage divider (with an output "V_feedback" 1640) comprising a pair of resistors 1630 and 1632, with a resistance value of 1.5M ohms and 220 k ohms, respectively). The voltage divider (resistors 1630 and 1632) can be coupled to a capacitor 1650 to provide low pass filtering of the signal. As will be appreciated by one of skill in the art, other components and other values for the components shown may be used in constructing the circuit without departing from the concepts described herein.

In some embodiments, V_feedback may be measured by the MCU and compared to a threshold voltage V_thr in order to determine if an eCL is present in the compartment:

As an example, the processor can be configured to implement the following logic:

V_feedback>V_thr: lens is present;

V_feedback<V_thr: lens not present.

Lab tests conducted by the inventors have demonstrated the feasibility of such a feedback circuit when tested on a bread board with test antennas/coils.

The processor comprising the MCU can be configured in many ways and may comprise one or more of a small form factor, an oscillator, or an external oscillator to reduce power consumption of the MCU.

The charging antenna coil can be configured to match the resonant frequency of the eCL coil. The charging antenna coil circuit may comprise capacitors in a parallel configuration and a trimming capacitor, for example.

The charging antenna coils can be operated (energized) sequentially or substantially simultaneously.

FIGS. 17A through 17D show a set of geometrical sweeps tested with dummy lenses with an axial coil displacement. Geometrical sweeps were measured (using an antenna coil design with a coil radius r=16 mm, and $R_L$=10MΩ) with a dummy eCL lens. The dummy lens comprises coils and circuitry configured to correspond to the circuitry and coil of an eCL.

Figure 17A:
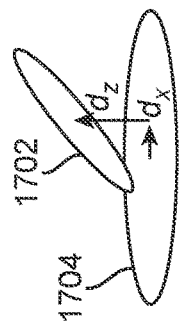
FIGS. 17A through 17D show a set of geometrical sweeps tested with dummy lenses with an axial coil displacement, in accordance with some embodiments.

FIG. 17A shows the induced voltage $V_{ind}$ (in volts) in the test coil on the vertical axis as a function of the axial distance $d_z$ (in mm) between the charging coil and the eCL coil. As shown, the induced voltage decreases with increasing axial distance. The induced voltage at 0 mm axial displacement is approximately 6V, and the induced voltage at 10 mm of axial displacement is approximately 3V.

Figure 17B:
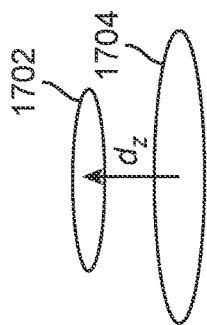

FIG. 17B shows the arrangement of the eCL coil 1702 and the charging coil 1704 for the sweeps of FIG. 17A, with the axial distance or separation $d_z$ identified.

Figure 17C:
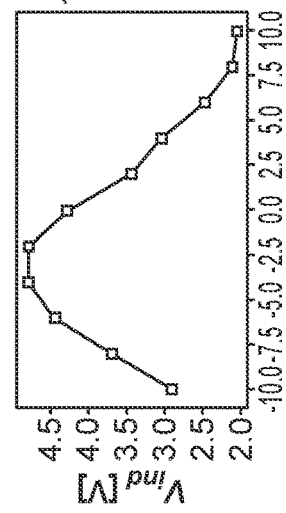

FIG. 17C shows the induced voltage $V_{ind}$ (in volts) as a function of the axial displacement $d_z$ (in mm) with the axis of the lens coil tilted at 450 with respect to the charging coil and a lateral displacement distance $d_x$=7 mm. As shown, the induced voltage changes from approximately 3V at −10 mm to a peak of approximately 5V at −3 mm and then decreases to approximately 2V at an axial displacement $d_z$ of 10 mm.

Figure 17D:
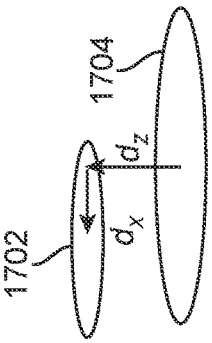

FIG. 17D shows the arrangement of the eCL coil 1702 and the charging coil 1704 for the sweeps of FIG. 17C, with the axial distance or separation $d_z$ and the lateral displacement distance $d_x$ identified.

Figure 17E:
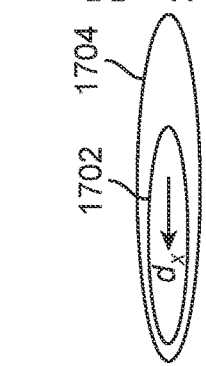
FIGS. 17E through 17H show a set of geometrical sweeps tested with dummy lenses with a lateral coil displacement, in accordance with some embodiments.
Figure 17F:
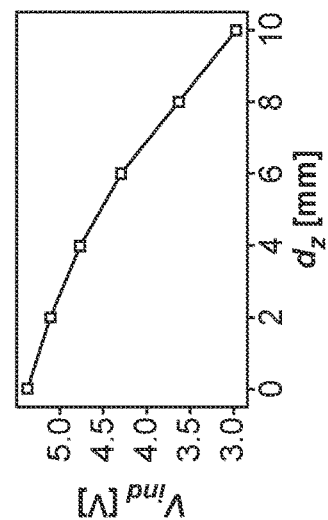

FIGS. 17E through 17H show a set of geometrical sweeps tested with dummy lenses with a lateral coil displacement. FIG. 17E shows the induced voltage $V_{ind}$ (in volts) as a function of lateral distance or offset $d_x$ and an axial displacement of d=0 mm. The dotted line in the figure indicates where the eCL coil is touching the charging coil. FIG. 17F shows the arrangement of the contact lens coil 1702 and charging coil 1704 for the sweeps of FIG. 17E, with the lateral displacement distance $d_x$ identified.

Figure 17G:
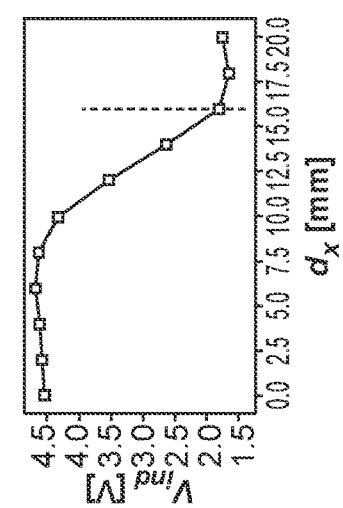
Figure 17H:
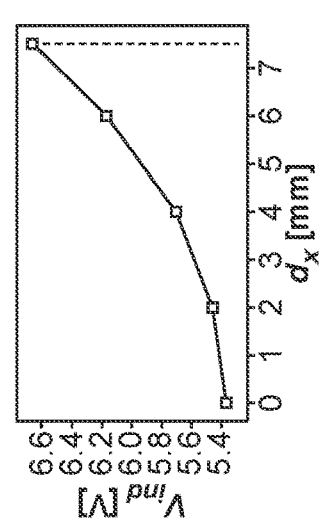

FIG. 17G shows the induced voltage $V_{ind}$ (in volts) as a function of lateral distance or offset $d_x$ and an axial displacement $d_z$=5 mm. The dotted line in the figure indicates the boundary of the charging coil. FIG. 17H shows the arrangement of the contact lens coil 1702 and charging coil 1704 for the sweeps of FIG. 17G, with the axial distance or separation $d_z$ and the lateral displacement distance $d_x$ identified.

FIGS. 18A and 18B show a set of geometrical sweeps tested with dummy eCL lenses with an axial coil displacement. In these examples, the antenna or charging coil had a radius of 7.5 mm and RL=10MΩ. FIG. 18A shows the induced voltage $V_{ind}$ (in volts) with a change in axial distance $d_z$ from 2 to 16 mm. FIG. 18B shows the geometry of the charging coil 1804 and the contact lens coil 1802 for this example, with the axial distance or separation $d_z$ identified.

FIGS. 18C and 18D show a set of geometrical sweeps tested with dummy lenses with an axial coil displacement and with the lens coil tilted at 45 degrees. FIG. 18C shows the induced voltage $V_{ind}$ (in volts) for the lateral displacement or offset $d_x$ set to −7 mm (upper plot) and 7 mm (lower plot), as the axial distance $d_z$ changes from 6 mm to 14 mm. FIG. 18D shows the charging coil 1804 and contact lens coil 1802 arrangement for this example, with the axial distance or separation $d_z$ and the lateral displacement distance $d_x$ identified.

FIGS. 18E and 18F show a set of geometrical sweeps tested with dummy lenses with a lateral coil displacement. FIG. 18E shows the induced voltage $V_{ind}$ (in volts) with the axial distance $d_z$ set to 5 mm, and the lateral displacement changing from 0 to 14 mm. The dotted line in the figure indicates the radius of the charging coil. FIG. 18F shows the arrangement of the charging coil 1804 and contact lens coil 1802 for this example, with the axial distance or separation $d_z$ and the lateral displacement distance $d_x$ identified.

FIG. 18G shows a test probe 1810 comprising a coil 1812 corresponding to a dummy lens being swept over a test charging coil 1814, in accordance with the tests/experiments and measurements described with reference to FIGS. 17A to 18F.

The sweeps of FIGS. 17A to 17H were measured with a charging coil comprising a radius of 16 mm. The sweeps of FIGS. 18A to 18F were measured with a charging coil comprising a radius of 7.5 mm.

The sweeps of FIGS. 17A to 18F suggest that a smaller coil is slightly more efficient, but that a larger coil provides a decrease in sensitivity to displacement of the contact lens coil (0.4% vs. 0.3% @ 3.0V and 10 MOhm).

Work in relation to the present disclosure suggests that it may be advantageous to place the charging coil a bit above the eCL lens to be in an optimal position; it is believed that this will cause the system to be less sensitive to dislocation of the lens.

Work in relation to the present disclosure suggests that a charging coil within a diameter or maximum dimension of range from about 25 mm to about 35 mm, e.g., from about 26 mm to about 32 mm, will provide decreased sensitivity to displacements and sufficiently efficient charging of the eCL coil.

In some embodiments, the cross-sectional thickness of the coil or coils can be suitably dimensioned to decrease the eCL coil resistance. For example, doubling the thickness (and cross-sectional area) can reduce the coil resistance by a factor of two.

In some embodiments, lowering the load input impedance by adding voltage multiplication stages may improve the power transfer efficiency.

Figure 19:
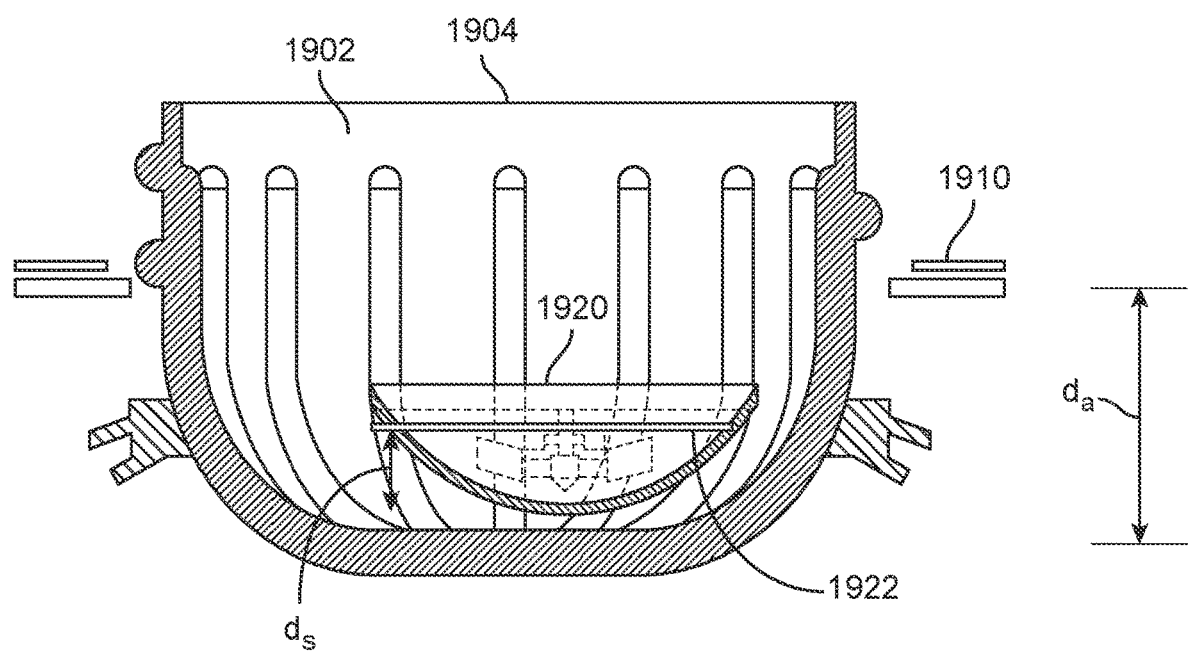
FIG. 19 shows an eCL charging case with a charging coil located above the coil of the lens placed in the container, in accordance with some embodiments.

FIG. 19 shows an eCL charging case container 1902 with a charging coil 1910 located above the coil 1922 of the lens 1920 placed in the container or compartment. The contact lens 1920 is shown in the compartment 1902 with the contact lens resting on an interior surface of the compartment. The charging coil 1910 can be located above the position of the eCL coil 1922 when a vertex of the contact lens 1920 is supported with a lower interior surface of the compartment. The charging coil 1910 can be axially displaced from the lower interior surface of the compartment toward the opening 1904 of the compartment. In some embodiments, the charging coil 1910 is located closer axially to the opening 1904 of the compartment 1902 than to the coil 1922 of the contact lens 1920. The eCL may comprise an axial sag distance ds extending between a vertex of the contact lens 1920 and the coil 1922 of the eCL. In some embodiments, the axial distance da from the lower interior surface of the compartment to the charging coil 1910 coil is greater than the axial sag distance ds between the vertex of the eCL and the coil of the eCL. In some embodiments the axial distance da between the lower interior surface of the compartment and the charging coil comprises at least 3 mm and can be within a range from about 3 mm to about 9 mm, for example.

Figure 20:
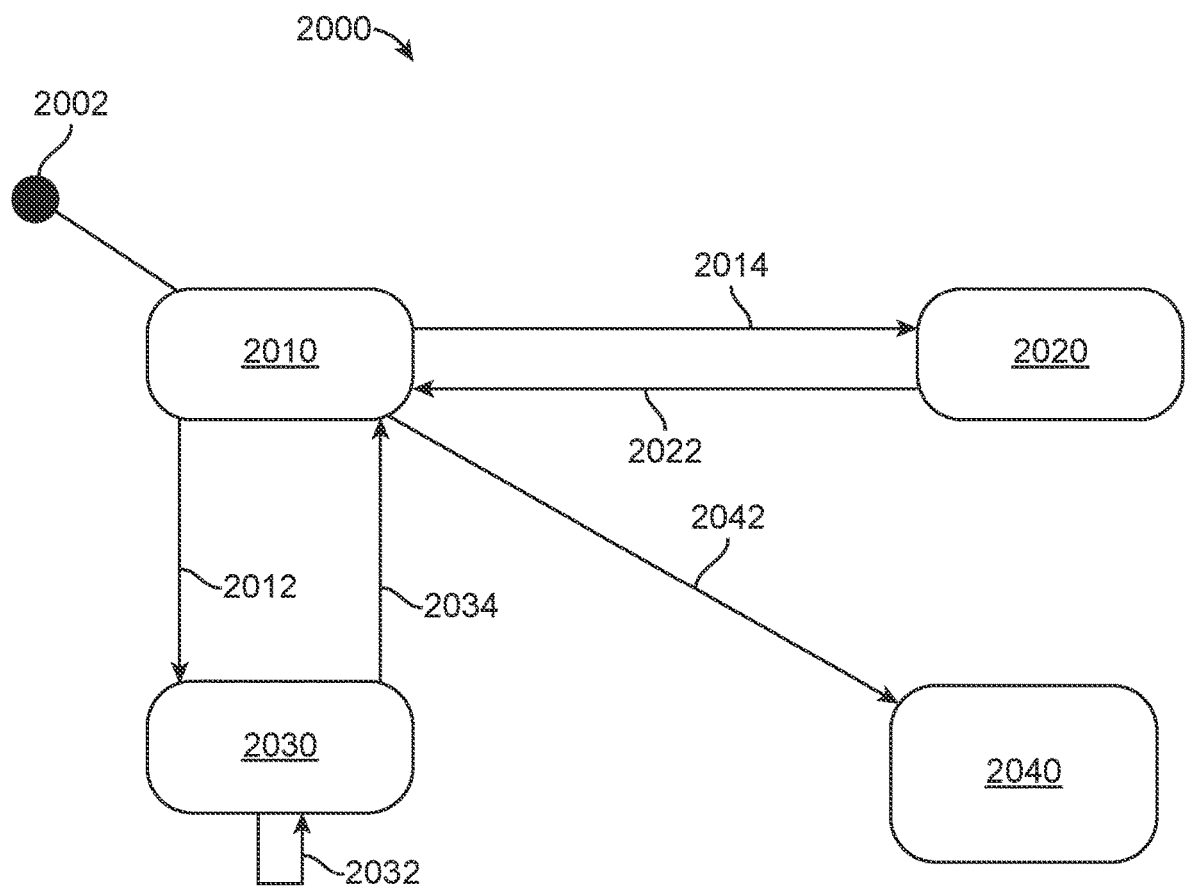
FIG. 20 shows a wireless charger main state machine that may be used in implementing the electronic contact lens charging case, in accordance with some embodiments.

FIG. 20 shows an embodiment of a charger state machine 2000 that may be used in implementing the electronic contact lens charging case of the present disclosure.

In some embodiments, the working flow of the charger state machine is, in a broad sense, starting from an initial point 2002:

Idle state 2010: eCL Charger firmware ("FW") starts target (device) detection, if a target has been detected, it changes to the charging state, otherwise it switches to the idle state. The idle state 2010 may transition to the charging state 2030 through a device detected 2012 operation. The idle state may transition to the sleep state 2020 through a no device detected 2014 operation.

Sleep state 2020: Sleep for a predefined time period and at wake-up change to the idle state. A Sleep state may be entered from the Idle state when a target is not detected. The sleep state 2020 may transition to the idle state 2010 through a wakeup operation 2022.

Charging state 2030: Charge the target device when a target is detected, check periodically if the target is still available, if not change to Idle state, otherwise stay at charging state. If a charging timeout occurs, switch to sleep mode and change the periodic target detection timeout. As shown, if a device is detected 2012, the state machine 2000 transitions from the idle state 2010 to the charging state 2030, where the state machine continues to check for the device 2032. If no device is detected 2034, then the state changes to the idle state 2010.

Error state 2040: this state is entered if an error has occurred during Idle state 2010, such as a bootup error 2042.

In general, the error state can be left by resetting/repowering the charging circuitry.

Figure 21:
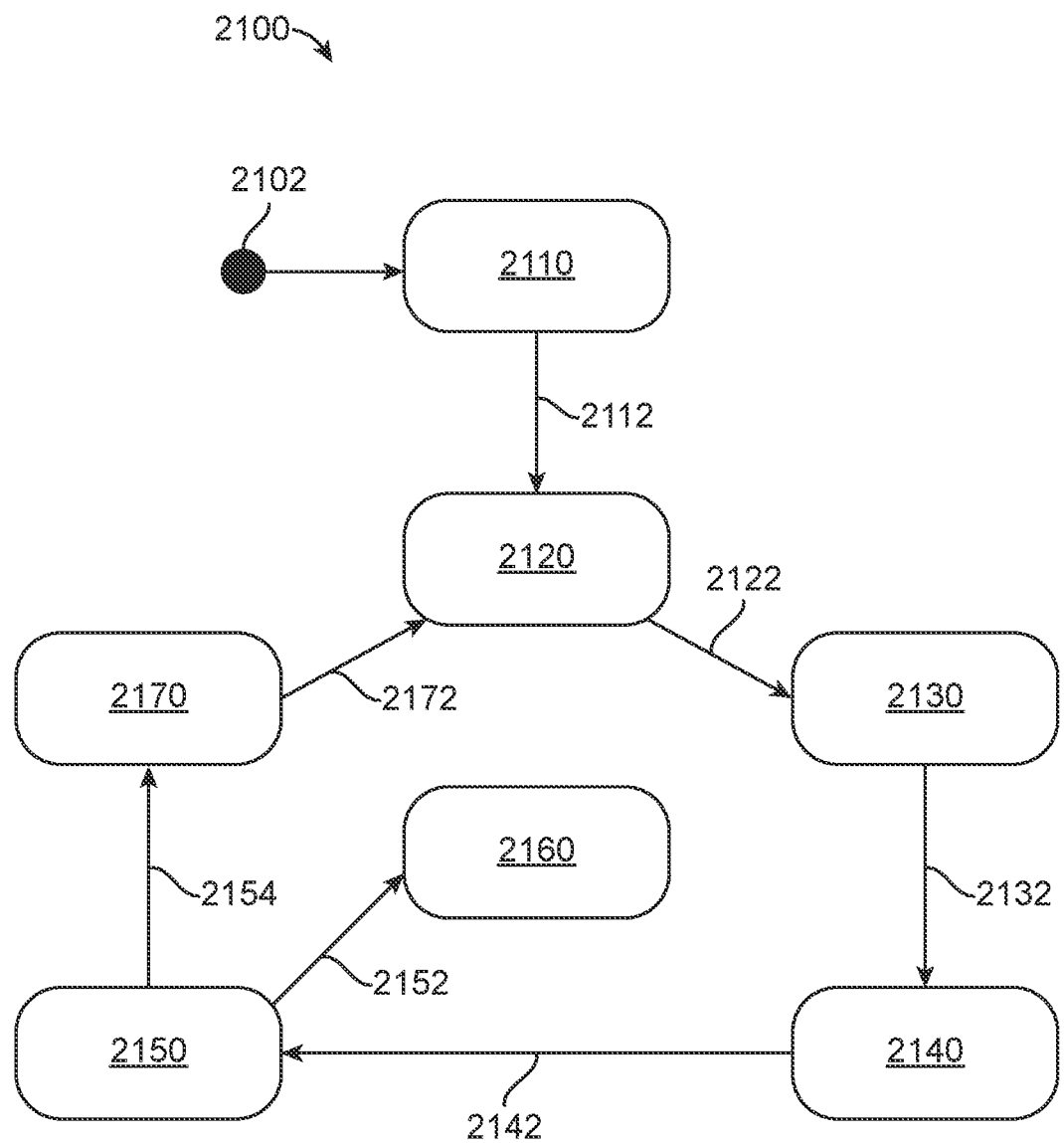
FIG. 21 shows a target detection state machine that may be used in implementing the electronic contact lens charging case, in accordance with some embodiments.

FIG. 21 shows an embodiment of a target (device) detection state machine 2100 that may be used in implementing the electronic contact lens charging case of the present disclosure.

In some embodiments, the working flow of the detection state machine is, in a broad sense, starting from an initial point 2102:

Unknown state 2110: an Uninitialized state. Once initialized 2112, the state machine 2100 moves to an idle state 2120.

Idle state 2120: the state machine 2100 is prepared to perform target (device) detection. A start target detection operation 2122 is begun.

ChargerClockEnable state 2130: in this state, the clock is enabled waiting for stabilization of the circuitry. Once the clock is enabled and a stabilization or delay time period has elapsed 2132, the state machine 2100 transitions to the search target state.

SearchTarget state 2140: in this state, the circuitry is reading (acquiring) data from the feedback ADC after expiration of the stabilization delay or timeout. After acquisition of the feedback data, the data is provided 2142 to the preprocessing state.

Preprocessing state 2150: in this state, the provided data is checked and may be averaged or otherwise processed. If an error in the data is found 2152, the state machine 2100 transitions to the error state.

Error state 2160: this state is entered if, for example, the data is corrupted, such as being of an invalid type or size. If the data does not generate an error and the preprocessing is completed (such as by averaging the read data), then the state machine 2100 transitions 2154 from the preprocessing state 2150 to the evaluation state.

Evaluation state 2170: in this state, the preprocessed data is evaluated to determine the presence or absence of a target (device). After evaluation of the data, the state machine 2100 transitions 2172 from the evaluation state to the idle state 2120.

Figure 22A:
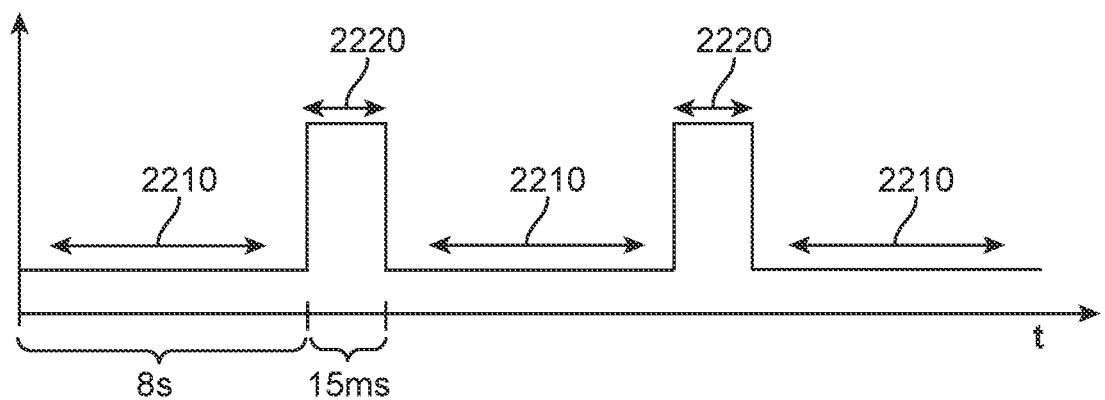
FIGS. 22A and 22B show the power states, in accordance with some embodiments.
Figure 22B:
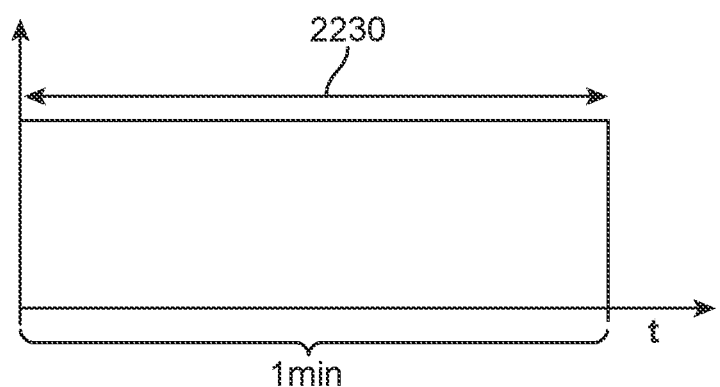

FIGS. 22A and 22B show the power levels (along the vertical axis) as a function of time (t) (along the horizontal axis) for the different states.

FIG. 22A shows the Sleep 2210 and Idle 2220 States; note that the Sleep state may last for several seconds and have a lower power level (for example 8 seconds), while the Idle state may be much shorter (for example, 15 ms) but have a higher power level.

FIG. 22B shows the Charging State 2230; note that the Charging state may last for tens of seconds (for example, one minute) and have an approximately constant power level.

In some embodiments, after charging, the sleep time may be increased to a defined value. During this phase, the state machine does not switch from Idle to Charging state if the target is available. However, if the target (e.g., the eCL coil) was not recognized after charging in the Idle state and later was recognized, then the state machine transitions to the Charging state.

Reference has been made to a charging case state machine or state machines, such as those illustrated in FIGS. 20 and 21. However, as described with reference to FIG. 1, the eCL may comprise a microcontroller (element 38 of FIG. 1) and in some embodiments, the microcontroller (or other form of processor or processing element) may be configured to implement an eCL state machine. The eCL state machine may be configured to implement one or more of the following states: (1) a charging state; (2) a resting or idle state; (3) a therapy or use state, and (4) an error state. The charging state refers to a state where the eCL is being charged by the charging case. The resting or idle state refers to a state where the eCL is not being charged and is not being used. The therapy or use state is a state where the eCL is actively being used so that it may be part of a treatment for, or collecting data from, a user. The error state is a state where an error has occurred in the charging process or the operation of the eCL.

Figure 23:
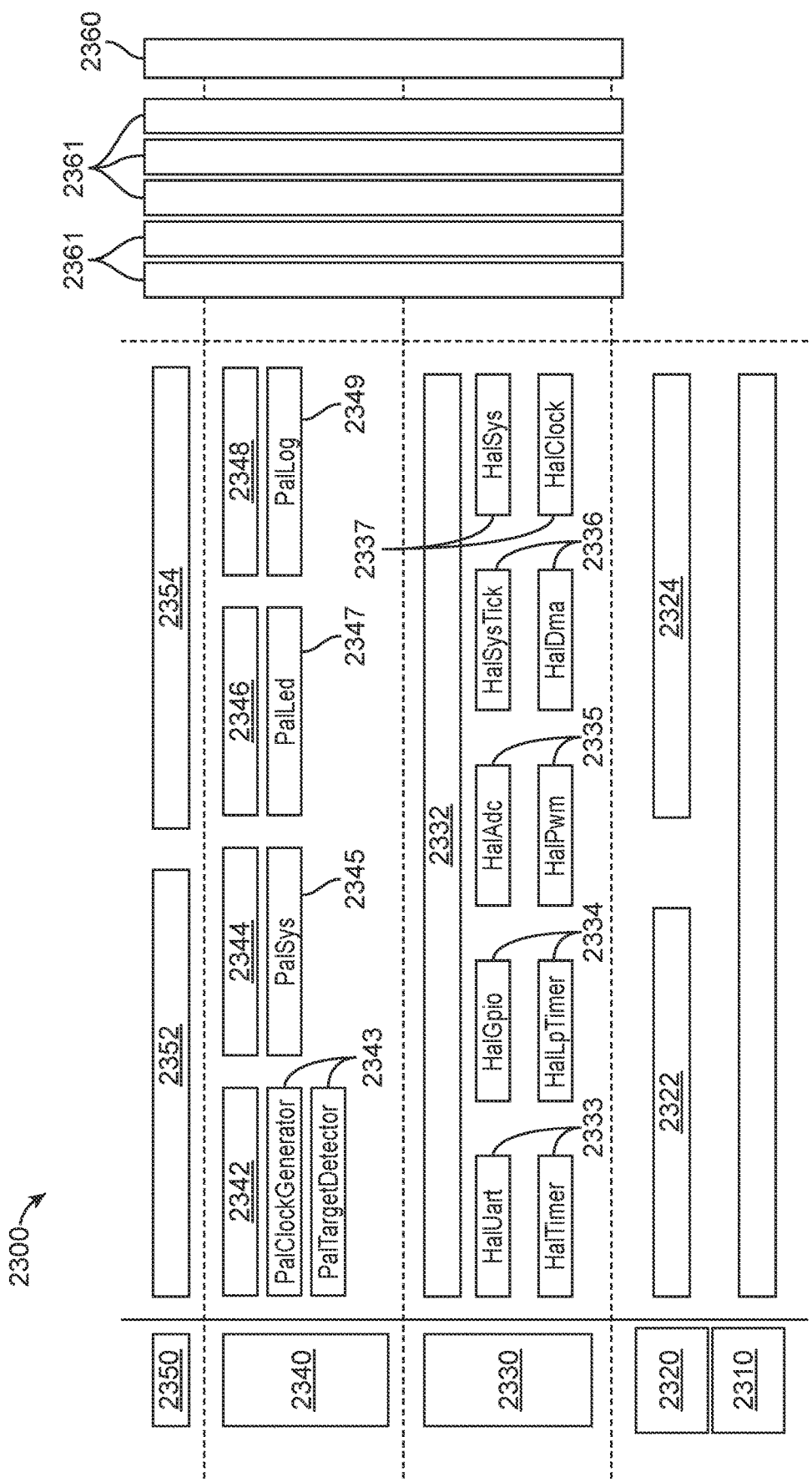
FIG. 23 shows a firmware abstraction layer, in accordance with some embodiments.

FIG. 23 shows a firmware abstraction layer architecture 2300 that may be used to implement an embodiment. The firmware abstraction layer comprises a hardware layer 2310 (e.g., with an MCU or other form of controller or processor), a third-party hardware abstraction layer (HAL) 2320 comprising a runtime 2322 (e.g., an IAR C Runtime) and a peripheral library 2324 (e.g., a ST Peripheral Library), a hardware abstraction layer (HAL) 2330 comprising a system control 2332 process and a set of functional capabilities, a progressive array logic (PAL) layer 2340 comprising charger 2342, system 2344, visual 2346, and log 2348 processes/functions, and an application (APP) layer 2350 comprising the primary functions of the charging case, including the charger 2352 and state machine 2354 functions. The architecture may also comprise a set of services or service layers 2360 to allow access to or monitoring of the functions performed by the layers and their respective processes, modules, or features.

One or more of the layers shown in FIG. 23 may include processes that operate to provide the functionality and features described herein. For example, in the PAL layer 2340, charger processes 2343 may comprise: a PalClockGenerator process and a PalTargetDetector process; system processes 2345 may comprise a PalSys process; visuals processes 2347 may comprise a PalLed process; and a log processes 2349 may comprise a PalLog process.

In the HAL layer 2330, system control processes may comprise: HalUart and HalTimer processes 2333; HalGpio and HalLpTimer processes 2334; HalAdc and HalPwm processes 2335; HalSysTick and HalDma processes 2336; and HalSys and HalClock processes 2337.

Services Layer 2360 may comprise SrvQueue, SrvEvent, SrvTimer, and SrvSwVersion processes 2361.

With regards to any of the functionality, layers, or processes described with reference to FIG. 23, one of ordinary skill in the art will understand these and how to implement them based on the descriptions and figures herein.

Figure 24:
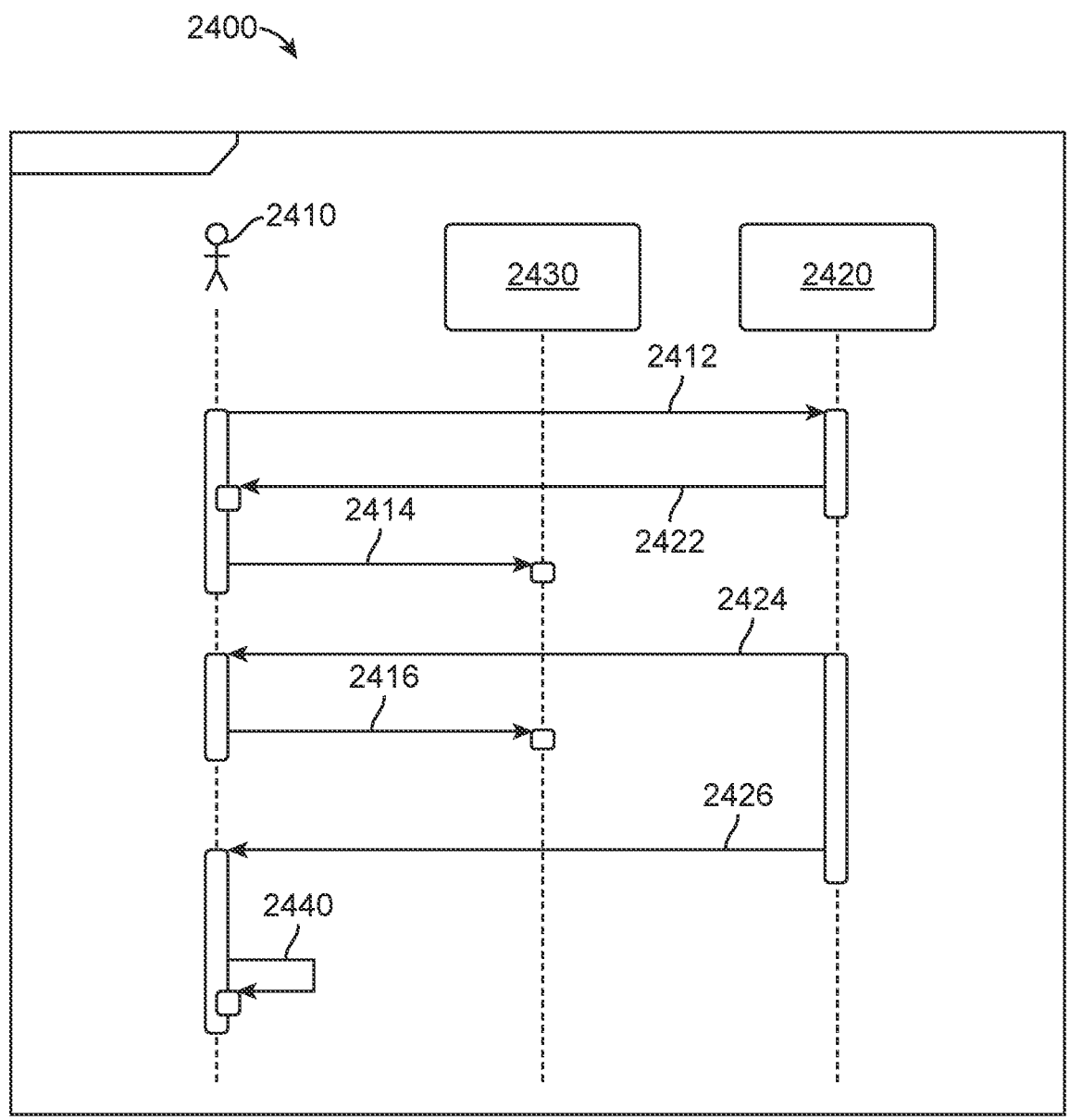
FIG. 24 shows a sequence diagram case where the eCL coil target is not found, in accordance with some embodiments.

FIG. 24 shows a sequence diagram 2400 for a situation where the eCL coil (the target) is not found. As shown in the figure, a StartTargetDetection( ) signal or instruction 2412 may be generated by a state machine 2410 and received by a target detection function 2420. This is followed by a StartClockGeneration( ) signal 2422 and a StartClock( ) operation 2414 received by a clock function 2430. After a specified time period or timeout, a StopClockGeneration( ) signal 2424 causes a StopClock( ) operation 2416. If no target has been detected during the time period, then a TargetNotDetected( ) 2426 signal is generated, followed by the charging device entering a Sleep( ) mode or state 2440.

Figure 25:
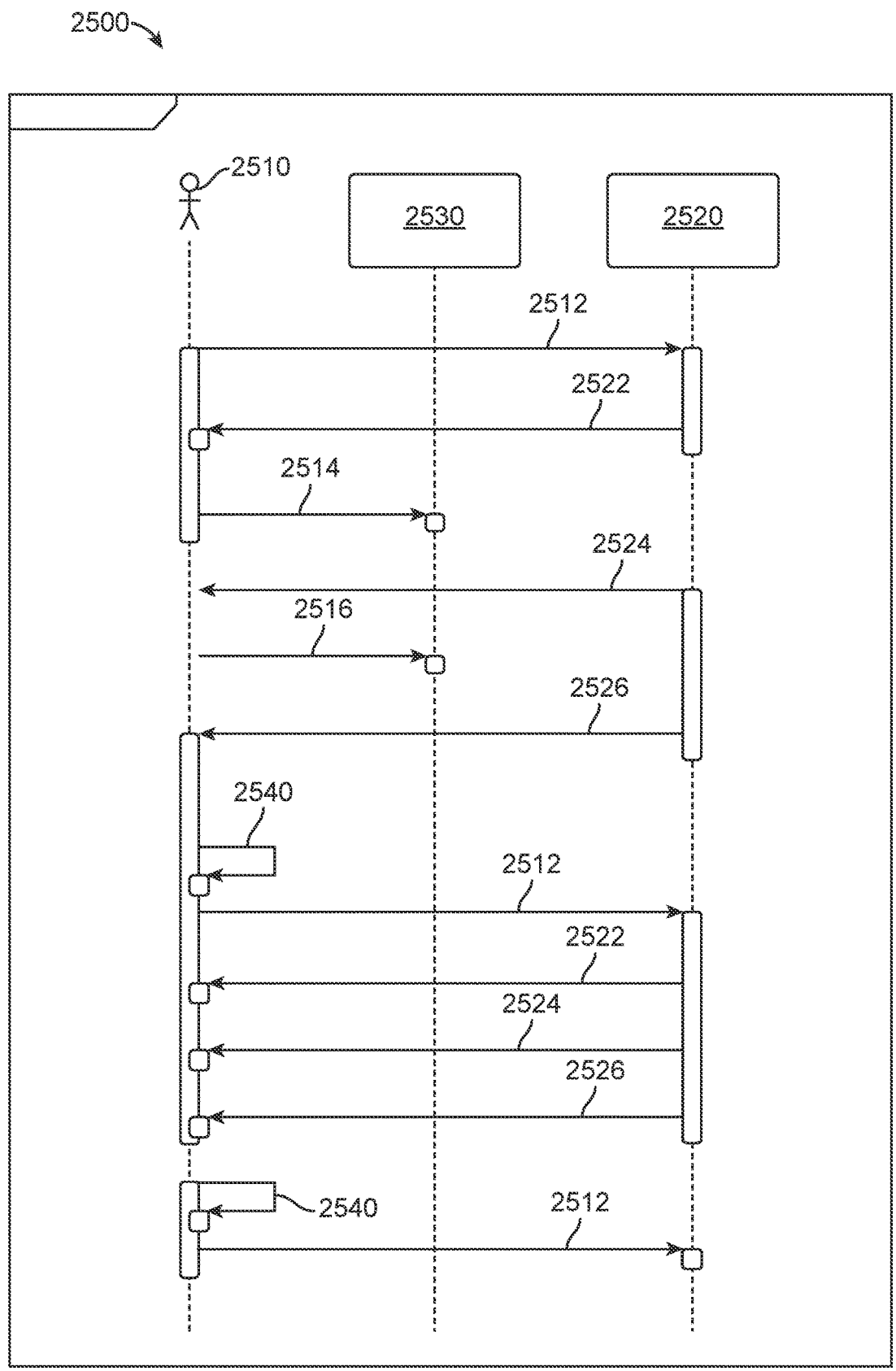
FIG. 25 shows a sequence diagram case where the target is found, in accordance with some embodiments.

FIG. 25 shows a sequence diagram 2500 for a situation where the eCL coil or target is found. As shown in the figure, a StartTargetDetection( ) signal or instruction 2512 may be generated by a state machine 2510 and received by a target detection function 2520. This is followed by a StartClockGeneration( ) signal 2522 and a StartClock( ) operation 2514 received by a clock function 2530. After a specified time period or timeout, a StopClockGeneration( ) signal 2524 causes a StopClock( ) operation 2516. If a target has been detected during the time period, then a TargetDetected( ) signal 2526 is generated, followed by the charging device entering a Charging( ) mode or state 2540. This is followed by a loop of StartTargetDetection( ) signal or instruction 2512, StartClockGeneration( ) signal 2522 and StopClockGeneration( ) signal 2524, and a TargetDetected( ) signal 2526 so as to remain in the Charging( ) mode or state 2540 as long as a target is detected.

The processor, e.g., the MCU, firmware and software can be configured to implement the system states and thresholds as described herein. In some embodiments, the MCU or other processor comprises configurable parameters related to the detection of the eCL coil, the charging process using the eCL coil, and the setting of the sleep time, the idle time, and other parameters, as described herein.

In some embodiments, the configurable parameters may comprise one or more of the following parameters:

Sleep time and a number of sleep cycles to be applied before "charged state" entered:
  a. COUNT_OF_SLEEPS_NO_TARGET
  b. SLEEP_TIME_NO_TARGET_SEC Sleep time after "charged state" achieved:
  a. COUNT_OF_SLEEPS_CHARGED
  b. SLEEP_TIME_TARGET_CHARGED_SEC Charging time:
  a. CHARGING_TIMEOUT_SEC Periodic Target detection check or confirmation during charging state:
  a. PERIODIC_TARGET_DETECTOR_SEC Delay between enabling clock and initiating feedback data acquisition:
  a. CHARGER_CLOCK_ENABLE_DELAY_MSEC Threshold Voltage for target detection:
  a. TARGET_DETECTOR_THRESHOLD As described herein, the computing devices and systems described and/or illustrated herein broadly represent any type or form of computing device or system capable of executing computer-readable instructions, such as those contained within the modules and elements described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. The processor may comprise a distributed processor system, e.g. running parallel processors, or a remote processor such as a server, and combinations thereof.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively, or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

As used herein, the terms "container" and "compartment" are interchangeable.

The present disclosure includes the following numbered clauses:

Clause 1. A charging case for an electronic contact lens (eCL), comprising: a power source; a container sized and shaped to receive the eCL; and a charging coil coupled to the power source, the charging coil comprising a maximum cross-sectional dimension larger than a maximum cross-sectional dimension of a coil of the eCL.

Clause 2. The charging case of clause 1, wherein the charging coil is configured to inductively couple to the coil of the eCL to charge the eCL.

Clause 3. The charging case of clause 1, wherein the charging coil defines a charging coil axis extending through a center and extending substantially perpendicular to the charging coil and the eCL coil defines an eCL coil axis extending through a center and extending substantially perpendicular to the eCL coil.

Clause 4. The charging case of clause 3, wherein the charging coil is configured to charge the eCL at a separation distance $\Delta d$ between a center of the charging coil and a center of the eCL coil within a range from 0 mm to about 20 mm, a lateral offset $\Delta a$ between the center of the charging coil and the center of the eCL coil within a range from about 0 mm to about 9 mm and a difference angle $\Delta\theta$ between the charging coil axis and the eCL coil axis within a range from about 0 degrees to about 45 degrees, and optionally wherein $\Delta d$ is within a range from 0 mm to about 10 mm, and $\Delta a$ is within a range from about 0 mm to about 5 mm.

Clause 5. The charging case of clause 1, wherein the charging coil is configured to charge the power source with an angle between the eCL coil axis and the charging coil axis within a range from about 0 degrees to about 20 degrees.

Clause 6. The charging case of clause 1, wherein the charging coil comprises an aperture sized to receive the contact lens, the charging coil extending around at least a portion of the container.

Clause 7. The charging case of clause 6, wherein the container comprises an axis and the charging coil is located axially along the container axis toward an opening of the container and away from a bottom end of the container to support the contact lens, and optionally wherein the charging coil is axially located closer to the opening than a charging coil of the contact lens when an apex of the contact lens rests on the bottom end of the container.

Clause 8. The charging case of clause 1, wherein charging coil is located on a printed circuit board (PCB) and wherein the PCB comprises an aperture sized to receive the container, the charging coil extending around at least the portion of the container received in the coil.

Clause 9. The charging case of clause 1, further comprising a saline solution in the container and wherein the charging coil is configured to charge the eCL when the eCL is placed in the saline solution.

Clause 10. The charging case of clause 1, further comprising a removable cover on the container, and a sterile contact lens solution comprising saline in the container, and wherein the charging coil is configured to charge the eCL through the sterile contact lens solution.

Clause 11. The charging case of clause 1, wherein the power source comprises one or more rechargeable batteries, and optionally wherein the charging case comprises a connector to couple to a source of electrical power to charge the one or more rechargeable batteries.

Clause 12. The charging case of clause 1, wherein the power source comprises one or more disposable batteries.

Clause 13. The charging case of clause 1, further comprising: power management circuitry operatively coupled to the power source and the charging coil to provide a stable current with a voltage within a range from 3.0 to 5 volts, and optionally within a range from 3.5 to 4.0 volts.

Clause 14. The charging case of clause 13, further comprising charging coil circuitry coupled to the power management circuitry and the charging coil to inductively transfer electrical power to the coil of the eCL.

Clause 15. The charging case of clause 1, wherein the maximum cross-sectional dimension of the charging coil comprises one or more of a diameter, a cross-sectional area, or a major axis of an ellipse and the maximum cross-sectional dimension of the eCL coil comprises one or more of a diameter, a cross-sectional area, or a major axis of an ellipse.

Clause 16. The charging case of clause 1, further comprising: a housing comprising an aperture sized to receive the container with a cover of the container located about the housing.

Clause 17. The charging case of clause 16, wherein the housing comprises a top part and a bottom part, the top part comprising the aperture.

Clause 18. The charging case of clause 17, wherein the charging coil is located between the top part and the bottom part and sized to receive at least a portion of the container.

Clause 19. The charging case of clause 16, wherein the container comprises a fitting to engage an inner structure of the housing and retain the container inserted through the aperture with a cover extending outside the housing and optionally wherein the fitting comprises a snap fitting.

Clause 20. The charging case of clause 16, wherein the container comprises a sealed sterile compartment comprising a sterile contact lens in a sterile contact lens solution, and wherein the container is sealed with a first removable cover and a second removable cover, the first removable cover configured to be removed after the second removable cover has been removed and optionally wherein the first removable cover comprises one or more of a foil or a plastic membrane and optionally wherein the second removable cover is threaded onto an upper portion of the container.

Clause 21. The charging case of clause 16, wherein the housing is configured to receive a first container in the aperture, to enable removal of the first container from the aperture after a plurality of days, and to insert a second container into the aperture after a plurality of days, in order to allow the charging case to be used with the second container.

Clause 22. The charging case of clause 1, further comprising: a processor operatively coupled to the power source and the charging coil; charging coil drive circuitry coupled to the processor and the charging coil; and eCL detection circuitry coupled to the charging coil and the processor to detect placement of the eCL in the container; wherein the processor is configured with instructions to drive the charging coil drive circuitry with a clock signal in response to a signal from the eCL detection circuitry.

Clause 23. The charging case of clause 22, wherein the processor is configured to implement a charging case state machine.

Clause 24. The charging case of clause 22, wherein the charging case state machine comprises Idle, Sleep, Charging, and Error states.

Clause 25. The charging case of clause 1, wherein the eCL comprises a processor or processing element.

Clause 26. The charging case of clause 25, wherein the processor or processing element is configured to implement an eCL state machine.

Clause 27. The charging case of clause 26, wherein the eCL state machine comprises Charging, Resting, Therapy, and Error states.

Clause 28. The charging case of clause 25, wherein the eCl comprises a source of illumination.

Clause 29. The charging case of clause 25, wherein the eCl comprises a battery.

Clause 30. The charging case of any one of preceding clauses, wherein the eCL comprises a first eCL with a first eCL coil and a second eCL with a second eCL coil, and the container comprises a first container and a second container sized and shaped to receive the first eCL and the second eCL, respectively, and wherein the charging coil comprises a first charging coil and a second charging coil to charge the first eCL and the second eCL, respectively, and wherein the first charging coil and the second charging coil each comprises a maximum distance across greater than the first eCL coil and the second eCL coil, respectively.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A charging case for an electronic contact lens (eCL), comprising:
    a housing;
    a power source within the housing;
    a container sized and shaped to receive the eCL;
    an aperture formed in the housing and shaped to receive the container therein;
    a charging coil coupled to the power source, the charging coil comprising a maximum cross-sectional dimension larger than a maximum cross-sectional dimension of a coil of the eCL; and
    a protrusion extending from the container and configured to couple the container to the housing while the charging coil charges the eCL.

2. The charging case of claim 1, wherein the charging coil is configured to inductively couple to the coil of the eCL to charge the eCL.

3. The charging case of claim 1, wherein the charging coil defines a charging coil axis extending through a center and extending substantially perpendicular to the charging coil and the eCL coil defines an eCL coil axis extending through a center and extending substantially perpendicular to the eCL coil.

4. The charging case of claim 3, wherein the charging coil is configured to charge the eCL at a separation distance $\Delta d$ between a center of the charging coil and a center of the eCL coil within a range from 0 mm to about 20 mm, a lateral offset $\Delta a$ between the center of the charging coil and the center of the eCL coil within a range from about 0 mm to about 9 mm and a difference angle $\Delta \theta$ between the charging coil axis and the eCL coil axis within a range from about 0 degrees to about 45 degrees.

5. The charging case of claim 1, wherein the charging coil is configured to charge the power source with an angle between the eCL coil axis and the charging coil axis within a range from about 0 degrees to about 20 degrees.

6. The charging case of claim 1, wherein the charging coil comprises an aperture sized to receive the eCL, the charging coil extending around at least a portion of the container.

7. The charging case of claim 6, wherein the container comprises an axis and the charging coil is located axially along the container axis toward an opening of the container and away from a bottom end of the container to support the eCL.

8. The charging case of claim 1, wherein charging coil is located on a printed circuit board (PCB) and wherein the PCB comprises an aperture sized to receive the container, the charging coil extending around at least the portion of the container received in the coil.

9. The charging case of claim 1, further comprising a saline solution in the container and wherein the charging coil is configured to charge the eCL when the eCL is placed in the saline solution.

10. The charging case of claim 1, further comprising a removable cover on the container, and a sterile contact lens solution comprising saline in the container, and wherein the charging coil is configured to charge the eCL through the sterile contact lens solution.

11. The charging case of claim 1, wherein the power source comprises one or more rechargeable batteries.

12. The charging case of claim 1, wherein the power source comprises one or more disposable batteries.

13. The charging case of claim 1, further comprising:
    power management circuitry operatively coupled to the power source and the charging coil to provide a stable current with a voltage within a range from 3.0 to 5 volts.

14. The charging case of claim 13, further comprising charging coil circuitry coupled to the power management circuitry and the charging coil to inductively transfer electrical power to the coil of the eCL.

15. The charging case of claim 1, wherein the maximum cross-sectional dimension of the charging coil comprises one or more of a diameter, a cross-sectional area, or a major axis of an ellipse and the maximum cross-sectional dimension of the eCL coil comprises one or more of a diameter, a cross-sectional area, or a major axis of an ellipse.

16. The charging case of claim 1,
    wherein the aperture is sized to receive the container with a cover of the container located about the housing.

17. The charging case of claim 16, wherein the housing comprises a top part and a bottom part, the top part comprising the aperture.

18. The charging case of claim 17, wherein the charging coil is located between the top part and the bottom part and sized to receive at least a portion of the container.

19. The charging case of claim 16, wherein the container comprises a fitting to engage an inner structure of the housing and retain the container inserted through the aperture with a cover extending outside the housing.

20. The charging case of claim 16, wherein the container comprises a sealed sterile compartment comprising a sterile contact lens in a sterile contact lens solution, and wherein the container is sealed with a first removable cover and a second removable cover, the first removable cover configured to be removed after the second removable cover has been removed.

\* \* \* \* \*